United States Patent

Tsukamoto et al.

[11] Patent Number: 5,505,673
[45] Date of Patent: Apr. 9, 1996

[54] CONTROL SYSTEM FOR AUTOMATIC TRANSMISSIONS

[75] Inventors: Kazumasa Tsukamoto, Toyota; Masahiko Ando, Okazaki; Masahiro Hayabuchi; Toshihiro Kano, both of Anjo, all of Japan

[73] Assignee: Aisin AW Co., Ltd., Japan

[21] Appl. No.: 310,782

[22] Filed: Sep. 27, 1994

[30] Foreign Application Priority Data

Sep. 29, 1993 [JP] Japan .................................. 5-243365

[51] Int. Cl.$^6$ .................................................. F16H 61/26
[52] U.S. Cl. ...................... 477/130; 477/143; 477/158; 475/122
[58] Field of Search .................................. 475/120, 121, 475/122; 477/130, 143, 156, 158, 163, 154, 155, 161, 160

[56] References Cited

U.S. PATENT DOCUMENTS

| | | | |
|---|---|---|---|
| 3,707,891 | 1/1973 | Asano et al. .................. | 477/158 X |
| 4,539,869 | 9/1985 | Suga et al. ..................... | 477/63 |
| 5,088,357 | 1/1991 | Kamada et al. . | |
| 5,368,531 | 11/1994 | Ando et al. .................... | 477/143 X |
| 5,393,279 | 2/1995 | Bota et al. ..................... | 477/143 |
| 5,417,627 | 5/1995 | Iizuka ............................ | 477/143 |

FOREIGN PATENT DOCUMENTS

| | | |
|---|---|---|
| 0354004 | 2/1990 | European Pat. Off. . |
| 4138080 | 5/1992 | Germany . |

OTHER PUBLICATIONS

Patent Abstracts of Japan vol. 8, No. 120 (M-300) 6 Jun. 1984 & JP-A-59 026 660.

*Primary Examiner*—Rodney H. Bonck
*Assistant Examiner*—Peter Kwon
*Attorney, Agent, or Firm*—Lorusso & Loud

[57] ABSTRACT

A control system for an automatic transmission, includes a first hydraulic servo adapted to be fed with oil for effecting a shift to a target gear stage; a second hydraulic servo adapted to be fed with the oil for effecting a shift to the target gear stage; a limit oil feed circuit formed through an oil limit flow limiting device; a quick oil feed circuit bypassing the oil flow limiting device; and an oil passage switch for switching and connecting the limit oil feed circuit and the quick oil feed circuit to the first hydraulic servo and the second hydraulic servo. The oil passage switch feeds oil from the quick oil feed circuit to the first hydraulic servo and the second hydraulic servo, when the engine load is high, and feeds oil from the limit oil feed circuit to at least the first hydraulic servo when the engine load is low.

4 Claims, 19 Drawing Sheets

FIG. 3

| POSITION | | S1 | S2 | S3 | S4 | SLU | SLN | C1 | C2 | C0 | B1 | B2 | B3 | B0 | F1 | F2 | F0 |
|---|---|---|---|---|---|---|---|---|---|---|---|---|---|---|---|---|---|
| P | | ○ | × | ○ | ○ | × | — | × | × | × | × | × | × | × | × | × | × |
| R | Normal | ○ | × | ○ | ○ | × | — | × | ○ | ○ | × | × | ○ | × | × | × | ○ |
| R | Inhibited *1 | ○ | ○ | ○ | ○ | × | — | × | × | ○ | × | × | × | × | × | × | ○ |
| N | | ○ | ○ | ○ | *2 | × | — | × | × | *3 | × | × | × | *4 | × | × | × |
| D·2·L 1ST | Normal | ○ | × | ○ | ○ | × | — | ○ | × | ○ | × | × | × | × | × | ○ | ○ |
| D·2·L 1ST | Engine Braking | ○ | × | ○ | × | × | △ | ○ | × | ○ | × | ○ | × | × | × | × | ○ |
| D·2·L 2ND | Normal | ○ | ○ | ○ | ○ | ◎ | — | ○ | × | ○ | × | ○ | × | × | ○ | × | ○ |
| D·2·L 2ND | Engine Braking | ○ | ○ | ○ | × | ◎ | △ | ○ | × | ○ | × | ○ | × | × | × | × | ○ |
| D·2·L 3RD | | × | ○ | ○ | ○ | ◎ | — | ○ | ○ | ○ | △ | ○ | × | × | × | × | ○ |
| D·2·L 4TH | | × | ○ | × | ○ | ◎ | △ | ○ | ○ | × | × | ○ | × | ○ | × | × | × |
| 1→2 Shift | | ○ | × | ○ | ○ | ◎ | △ | ○ | × | ○ | △ | △ | × | × | △ | △ | ○ |
| 2→3 Shift | | × | ○ | ○ | × | ◎ | △ | ○ | △ | ○ | × | ○ | × | × | △ | × | ○ |
| 3→4 Shift | | × | × | ○ | ○ | ◎ | △ | ○ | ○ | × | × | ○ | × | △ | × | × | △ |

| QUICK CONTROL | |
|---|---|
| ○ | ON |
| × | OFF |
| ◎ | ON :L-up ON  OFF :L-up OFF |
| △ | Duty Control during Shifting only |

| REMARKS | | |
|---|---|---|
| | Applied | Locked |
| | Released | Free |
| | Pressure Regulation by Pressure Control Valve | Depending upon Control Pressure |

FIG. 13
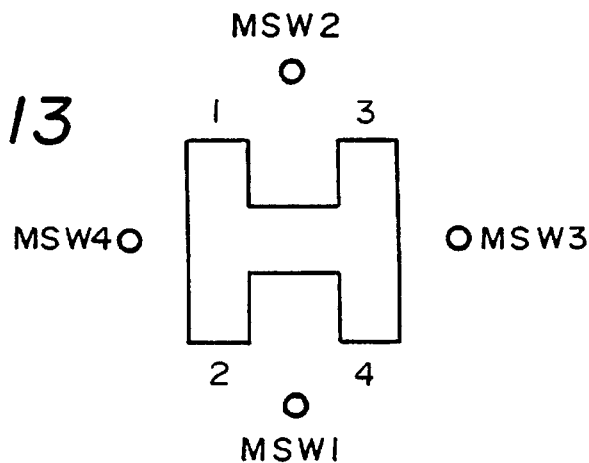
FIG. 14
| SHIFT POSITION | MANUAL SWITCH | | | |
|---|---|---|---|---|
| | MSW1 | MSW2 | MSW3 | MSW4 |
| D1 | × | O | × | O |
| D2 | × | O | O | × |
| D3 | O | × | × | O |
| D4 | O | × | O | × |
FIG. 15
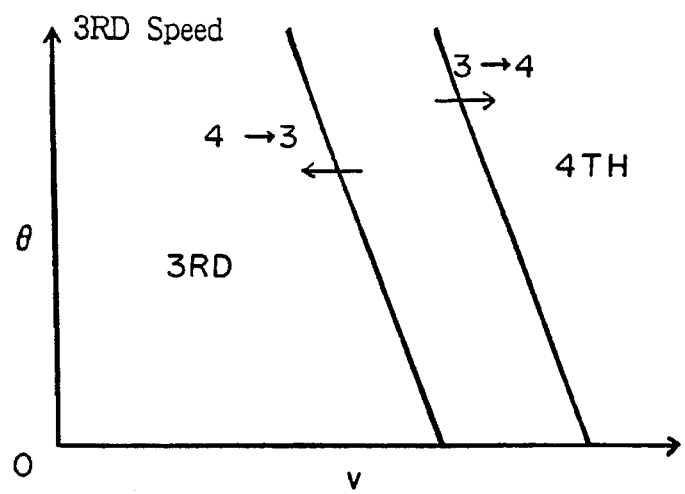

CONTROL SYSTEM FOR AUTOMATIC TRANSMISSIONS

BACKGROUND OF THE INVENTION

1. Field of the Invention

The present invention relates to a control system for an automatic transmission.

2. Description of the Related Art

Conventional automatic transmissions include a gear train, with rotation input from the engine to one gear element of the gear train and output from another gear element, and a plurality of frictional engagement elements, such as clutches and brakes, which are applied or released to transmit the rotation selectively between the individual gear elements, thereby establishing various gear stages by operatively combining different gear elements.

The frictional engagement elements are individually equipped with corresponding hydraulic servos. A shift to a predetermined gear stage can be effected, for example, by feeding oil to a hydraulic servo for a frictional engagement element which is not engaged and by draining oil from a hydraulic servo engaging its corresponding frictional engagement element.

In case, for example, the vehicle is to be run at a 2nd speed in D-range, the brake for the D-range is applied. However, if the vehicle is to be run at 2nd speed while effecting engine braking, the engine braking brake is applied in addition to the D-range brake.

Specifically, for running the vehicle at 2nd speed in the D-range, a sun gear to be rotated backwards is locked, but the torque necessary for this locking is low and thus it is sufficient to apply the D-range brake only. However, if the vehicle is run at the 2nd speed while effecting engine braking, not only the torque for locking the sun gear but also a reverse torque for effecting the engine brake is required so that the total torque necessary becomes extremely high. As a result, not only the brake for the D-range but also the brake for engine braking must be applied.

There has been proposed (in Japanese Patent Publication No. 40576/1992) a control system for an automatic transmission, in which brake capacity is changed according to the engine load by applying not only the brake for the D-range, but also the brake for engine braking, when the engine load is high, and by applying the brake for the D-range only when the engine load is low. Thus, the number of friction discs of the D-range brake is reduced to make it possible to reduce the size, to suppress the shift shock and to improve the durability of the friction discs.

In the control system of the prior art, however, the shifting time is prolonged because the two brakes are to be simultaneously applied. Specifically, when a clutch or brake is to be applied, the corresponding hydraulic servo is fed with oil through an orifice, and the oil pressure (hereinafter, the "apply pressure") in the hydraulic servo is raised under control of an accumulator. However, when two brakes are to be simultaneously applied, as described above, the two hydraulic servos must both be fed with the oil. This prolongs the time required for the individual hydraulic servos to be filled with oil and, accordingly, prolongs not only the period of time from the shift decision to the start of brake application, but also the period of time from the start of brake application to the end of application. As a result of the prolonging of the shift time period, the shift feel is poor.

SUMMARY OF THE INVENTION

The present invention has an object solution of the problems of the prior art control system for the automatic transmission and to provide a control system for an automatic transmission, which can shorten the shifting time, even when two or more frictional engagement elements are to be simultaneously applied, thereby improving the shift feeling.

Accordingly, the present invention provides an improved control system for an automatic transmission, coupled to and driven by an engine, for effecting shifts by applying/releasing a plurality of frictional engagement elements by selectively feeding/draining oil to/from a plurality of hydraulic servos. The improved control system includes a vehicle speed sensor for detecting vehicle speed, a throttle opening sensor for detecting throttle opening, electronic control means for outputting a shift signal on the basis of the signals coming from the two sensors and a hydraulic circuit for actuating solenoid valves in response to the shift signal of the electronic control means to feed oil pressure to selected hydraulic servos corresponding to individual gear stages, so that frictional engagement elements may be individually applied/released to establish a shift to the desired (hereinafter "target" or "targeted") gear stage. The hydraulic servos include first and second hydraulic servos adapted to be fed with oil pressure for effecting a shift to the targeted gear stage, a limit oil feed circuit for feeding the oil pressure through oil limit means, a quick oil feed circuit for feeding oil pressure with bypass of the oil limit means, an oil passage switch valve adapted to be switched for connecting either the limit oil feed circuit or the quick oil feed circuit selectively to the first hydraulic servo and the second hydraulic servo and a first solenoid valve for switching the oil passage switch valve in response to the signal of the electronic control means. The electronic control means includes power ON/OFF decision means for deciding the magnitude of engine load on the basis of the signal from the throttle opening sensor and valve switch means for feeding such a signal to the first solenoid valve so as to switch said oil passage switch valve to either (1) feed the oil pressure of the quick oil feed circuit to the first and second hydraulic servos when it is decided by the power ON/OFF decide means that the engine load is high or (2) feed the oil pressure of the limit oil feed circuit to at least the first hydraulic servo when it is decided that the engine load is low.

Thus, the individual brakes corresponding to the first hydraulic servo and the second hydraulic servo can be simultaneously applied. As a result, the number of friction discs of the brake may be reduced from the number that would otherwise be required, to thereby reduce the size, suppress the shift shock and improve the durability of the friction discs.

When the engine load is high, on the other hand, the oil of the quick oil feed circuit is quickly fed, bypassing the oil limit means, to the first and second hydraulic servos so that the time period required to fill (pressurize) the servos is shortened. This shortens not only the time between the shift decision and the start of application of the individual brakes operated by the first and second hydraulic servos but also the time period from between start of engagement of the individual brakes to the end of engagement. As a result, the shift time can be shortened to improve the shift feeling.

BRIEF DESCRIPTION OF THE DRAWINGS

FIG. 3 is a table of the operations of components of the automatic transmission in accordance with the present invention;

FIG. 13 is a schematic diagram of a manual switch which may be utilized in the prevent invention;

FIG. 14 is a table enumerating operations of the manual switch of FIG. 13;

FIG. 15 is a graph in the form of a shift map in accordance with the present invention;

DESCRIPTION OF THE PREFERRED EMBODIMENT

Figure 2:
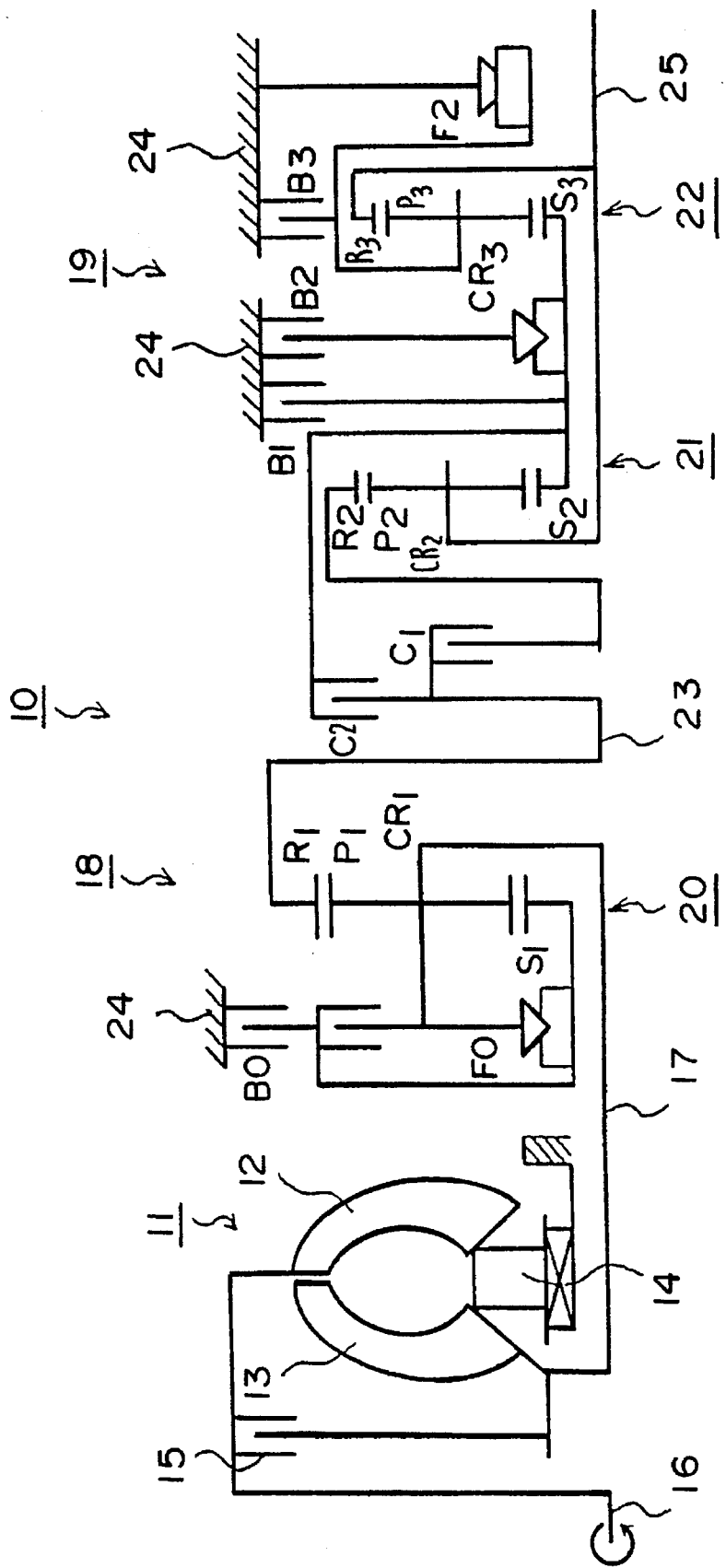
FIG. 2 is a schematic diagram of an automatic transmission to which the present invention may be applied.

An embodiment of the present invention will now be described in detail in the following with reference to FIG. 2. FIG. 2 shows an automatic transmission (T/M) 10 and a torque converter 11. The rotation generated by an engine (not shown) is transmitted through the torque converter 11 to the transmission 10, by which its speed is suitably changed, and then to drive wheels (not shown).

The torque converter 11 is composed of a pump impeller 12, a turbine runner 13, a stator 14 and, in addition, a lockup clutch 15 for improving the power transmission efficiency. The rotation of an input member 16 or the output shaft of the engine is transmitted to an input shaft 17 of the transmission 10, either indirectly by the flow of oil in the torque converter 11 or directly by locking the lockup clutch 15.

The transmission 10 is composed of an auxiliary transmission unit 18 and a main transmission unit 19, the former having an overdrive planetary gear unit 20 and the latter having a front planetary gear unit 21 and a rear planetary gear unit 22.

The overdrive planetary gear unit 20 is composed of: a carrier $CR_1$ connected to the input shaft 17 and supporting a pinion $P_1$; a sun gear $S_1$ enclosing the input shaft 17; and a ring gear $R_1$ connected to an input shaft 23 of the main transmission unit 19. Moreover, the carrier $CR_1$ and the sun gear $S_1$ are connected through a third clutch C0 and a third one-way clutch F0, and the sun gear $S_1$ and a casing 24 are connected through a fourth brake B0.

The front planetary gear unit 21 is composed of: a carrier $CR_1$ connected to an output shaft 25 and supporting a pinion $P_2$; a sun gear $S_2$ enclosing the output shaft 25 and made integral with a sun gear $S_3$ of the rear planetary gear unit 22; and a ring gear $R_2$ connected to the input shaft 23 through a first clutch C1. The input shaft 23 and the sun gear $S_2$ are connected through a second clutch C2, and the sun gear $S_2$ and the casing 24 are connected through a first brake B1 which is a band brake. The sun gear $S_2$ and the casing 24 are further connected through a first one-way clutch F1 and a second brake B2.

The rear planetary gear unit 22 is composed of a carrier $CR_3$ supporting a pinion $P_3$, and a ring gear $R_3$ made integral with the sun gear $S_3$ and the output shaft 25. The carrier $CR_3$ and the casing 24 are connected through a third brake B3 and a second one-way clutch F2 arranged in parallel with each other.

The automatic transmission has its solenoid valves S1 to S4, linear solenoid valves SLU and SLN, first clutch C1, second clutch C2, third clutch C0, first brake B1, second brake B2, third brake B3, fourth brake B0, first one-way clutch F1, second one-way clutch F2 and third one-way clutch F0 individually controlled, as tabulated in FIG. 3, in the individual gear stages of P-range, R-range, D-range, 2-range and L-range. With regard to the "Inhibited" R-range (*1 in FIG. 3), the speed which triggers a decision to inhibit running in the R-range is set at 20 Km/h. "*2" represents that the solenoid valves S1 to S4 in the N-range are controlled according to the vehicle speed in a D-range solenoid pattern. The third clutch C0 is applied in the 1st to 3rd speeds, as indicated at *3, and the fourth brake B0 is applied in the 4th speed, as indicated at *4.

At the 1st speed in the D-range, 2nd range or L-range, the first clutch C1 and the third clutch C0 are applied to bring the 2nd one-way clutch F2 and the third one-way clutch F0 into the locked state. In the overdrive planetary gear unit 20, therefore, a direct coupled state is established through the third clutch C0 and the third one-way clutch F0 so that the rotation of the input shaft 17 is transmitted as is to the input shaft 23 of the main transmission unit 19. In the main transmission unit 19, on the other hand, the rotation of the input shaft 23 is transmitted through the first clutch C1 to the ring gear R2 of the front planetary gear unit 21 and further to the carrier $CR_2$ and the output shaft 25 integrated with the carrier $CR_2$, to rotate the carrier $CR_3$ of the rear planetary gear unit 22 through the sun gears $S_2$ and $S_3$. However, the carrier $CR_3$ is blocked from rotation because the second one-way clutch F2 engages. As a result, the pinion $P_3$ rotates on its axis to transmit its decelerated rotation to the ring gear $R_3$ integrated with the output shaft 25.

At the 2nd speed in the D-range, 2nd-range or L-range, on the other hand, the first clutch C1, the third clutch C0 and the second brake B2 are applied to bring the first one-way clutch F1 and the third one-way clutch F0 into the locked state. In the overdrive planetary gear unit 20, therefore, the direct coupled state is maintained so that the rotation of the input shaft 17 is transmitted as is to the input shaft 23 of the main transmission unit 19. In the main transmission unit 19, on the other hand, the rotation of the input shaft 23 is transmitted through the first clutch C1 to the ring gear $R_2$ of the front planetary gear unit 21 to rotate the sun gear $S_2$ through the pinion $P_2$. However, this rotation of the sun gear $S_2$ is blocked because the first one-way clutch F1 is brought into the looked state by the application of the second brake B2. As a result, the carrier $CR_2$ rotates while allowing the pinion $P_2$ to rotate on its axis, so that the rotation at the 2nd speed is transmitted to the output shaft 25 only through the front planetary gear unit 21.

At the 3rd speed in the D-range, 2nd-range and L-range, on the other hand, the first clutch C1, the second clutch C2, the third clutch C0 and the second brake B2 are applied to bring the third one-way clutch F0 into the locked state. In the overdrive planetary gear unit 20, therefore, the direct coupled state is maintained so that the rotation of the input shaft 17 is transmitted as is to the input shaft 23 of the main transmission unit 19. In the main transmission unit 19, on the other hand, the first clutch C1 and the second clutch C2 are applied to bring the front planetary gear unit 21 into the direct coupled state so that the rotation of the input shaft 23 is transmitted as is to the output shaft 25.

At the 4th speed, i.e., the highest speed in the D-range, 2nd range or L-range, the first clutch CI, the second clutch C2, the second brake B2 and the fourth brake B0 are applied. In the main transmission unit 19, the third clutch C0 is released, and the fourth brake B0 is applied. As a result, the overdrive planetary gear unit 20 has its sun gear $S_1$ locked by the application of the fourth brake B0, and the pinion $P_1$ rotates on its axis together with the carrier $CR_1$, to transmit the rotation to the ring gear $R_1$ so that the overdrive rotation is transmitted to the input shaft 23 of the main transmission unit 19 in the direct coupled state.

Figure 4:
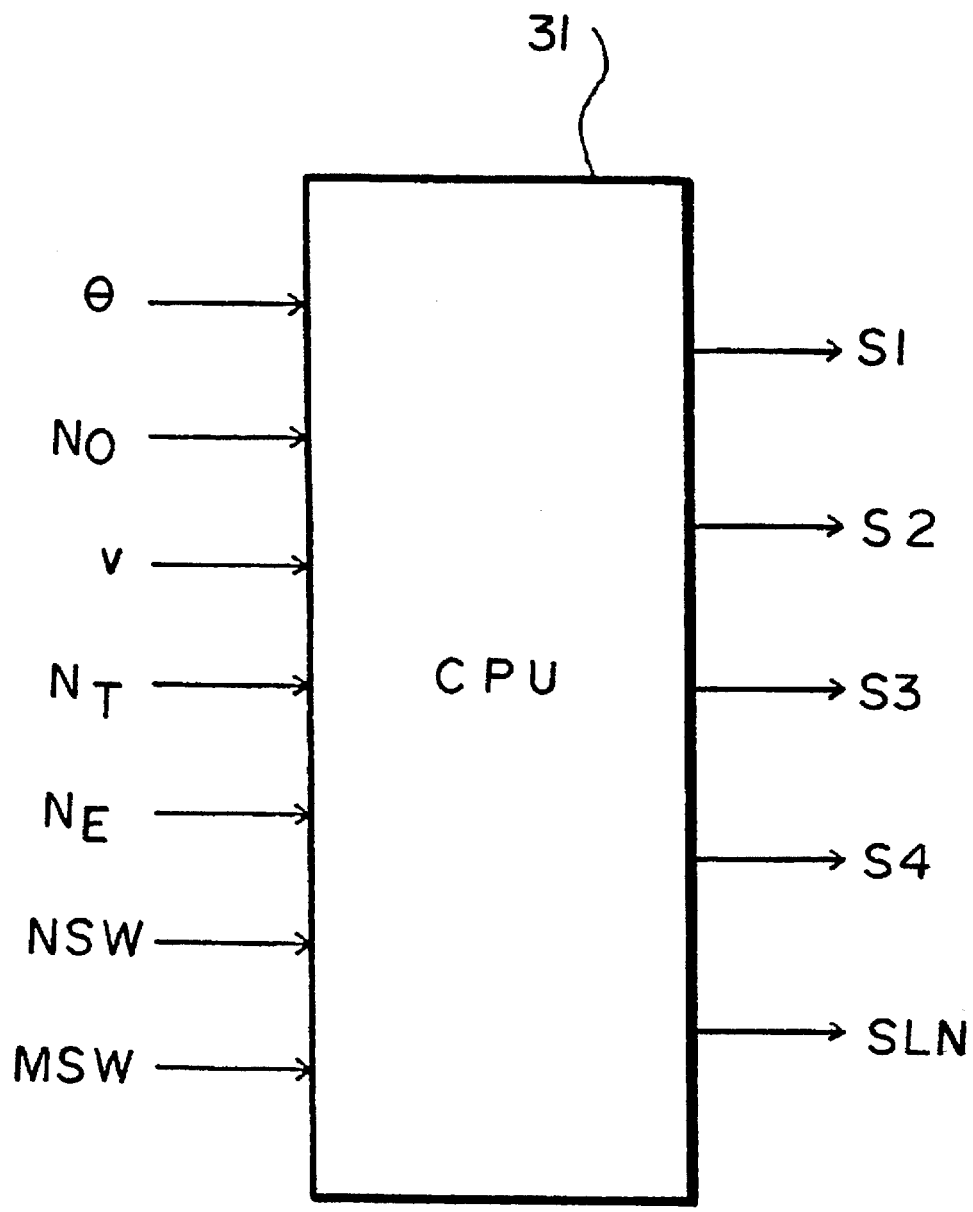
FIG. 4 is a schematic diagram showing a controller (CPU) for the automatic transmission and input and output signals in accordance one embodiment of the present invention.

The control system of the present invention will now be described with reference to FIG. 4. In FIG. 4, reference numeral 31 designates a CPU for controlling the entirety of the control system of the automatic transmission. This CPU 31 receives as input detection signals for throttle opening θ, output R.P.M. $N_O$, vehicle speed v, input R.P.M. $N_T$ and engine R.P.M. $N_E$, as individual detection signals. Incidentally, reference letters NSW designate a neutral switch signal, and letters MSW designate a manual switch signal.

The CPU 31 controls the solenoid valves S1 to S4 and the linear solenoid valve SLN. The solenoid valve S1 switches the 2-3 shift valve (not shown), the solenoid valve S2 switches the 1-2 shift valve (not shown) and the 3-4 shift valve (not shown), the solenoid valve S3 switches the B-1 timing valve (not shown); and solenoid valve S4 switches the engine brake control valve (not shown). The linear solenoid valve SLN regulates the pressure control valve (not shown).

The CPU 31 decides a shift pattern for the vehicle on the basis of the individual detection signals and controls the linear solenoid valve SLN on the basis of that decision.

Figure 5:
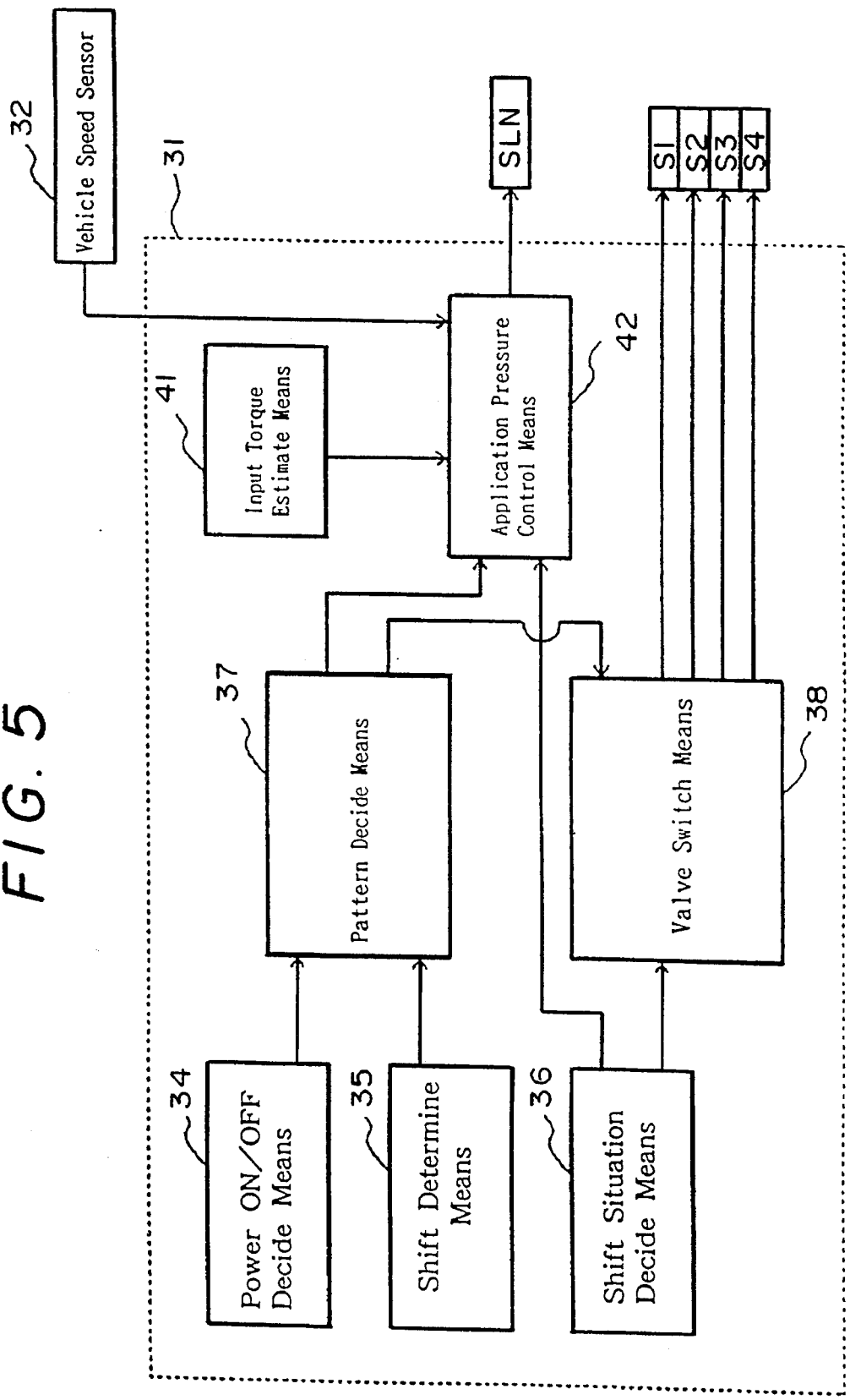
FIG. 5 is a block diagram of the control system of one embodiment of the present invention.

The CPU 31 is shown in more detail in FIG. 5 wherein numeral 31 designates the CPU, numeral 32 a vehicle speed sensor for detecting the vehicle speed v and numeral 34 a power ON/OFF decision means for deciding whether the vehicle is in the power ON state or in the power OFF state. The power ON/OFF decision means 34 judges whether or not the accelerator pedal (not shown) is depressed and, if depressed, decides the power ON state and, if not depressed, decides the power OFF state.

Shift determination means 35 determines whether the shift is to be an upshift or a downshift and, in the case of the upshift, whether or not the shift is to an intermediate gear stage. Shift situation decision means decides that the rotational change has ended. Pattern decision means 37 decides the shift pattern of the vehicle on the basis of the decision of the power ON/OFF decision means 34 and the decision of the shift decision means 35. Valve switch means 35 controls the solenoid valves S1 to S4 on the basis of the decision reached by the shift situation decision means 36 and the decision reached by the pattern decision means 37. Input torque estimation means 41 estimates the input torque. Application pressure control means 42 controls the linear solenoid valve SLN to establish an application pressure on the basis of the decision made by the shift situation decision means 36, the decision made the pattern decision means 37, and the estimation of the input torque estimation means 41.

Figure 6:
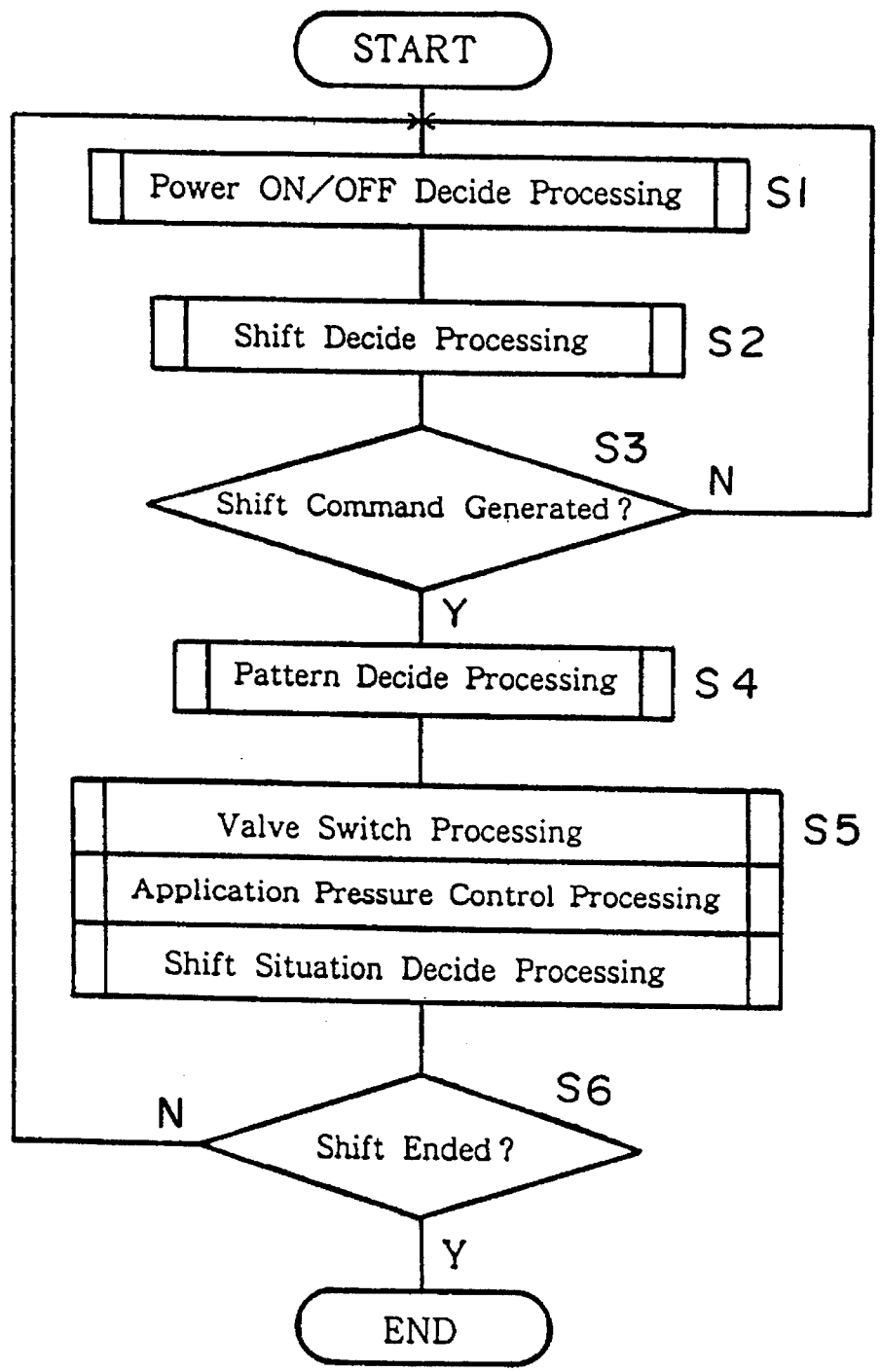
FIG. 6 is a main flow chart illustrating the quick control operations of the control system of the embodiment of the present invention illustrated in FIGS. 1 and 5.

Control operations of the control system of the present invention will now be described with reference to FIG. 6. In FIG. 6:

Step S1: The power ON/OFF decision means (of FIG. 5) decides either a power ON state or a power OFF state.

Step S2: The shift decision means 35 decides whether the shift is to be an upshift or a downshift and, in the case of an upshift, whether or not the shift is to an intermediate gear stage.

Step S3: It is decided whether or not a shift command has been issued. The routine advances to Step S4, if the shift command has been issued, but returns to Step S1, if not.

Step S4: The pattern decision means 37 decides a shift pattern for the vehicle.

step S5: The solenoid valves S1 to S4 are controlled by the valve switch means 38, and the linear solenoid valve SLN is controlled by the application pressure control means 42 to establish the appropriate application pressure. The shift situation decision means 36 decides the end of rotational change.

Step S6: It is decided whether or not the shift has been completed. The routine ends, if the shift has been completed, and returns to Step S1, if not.

Figure 7:
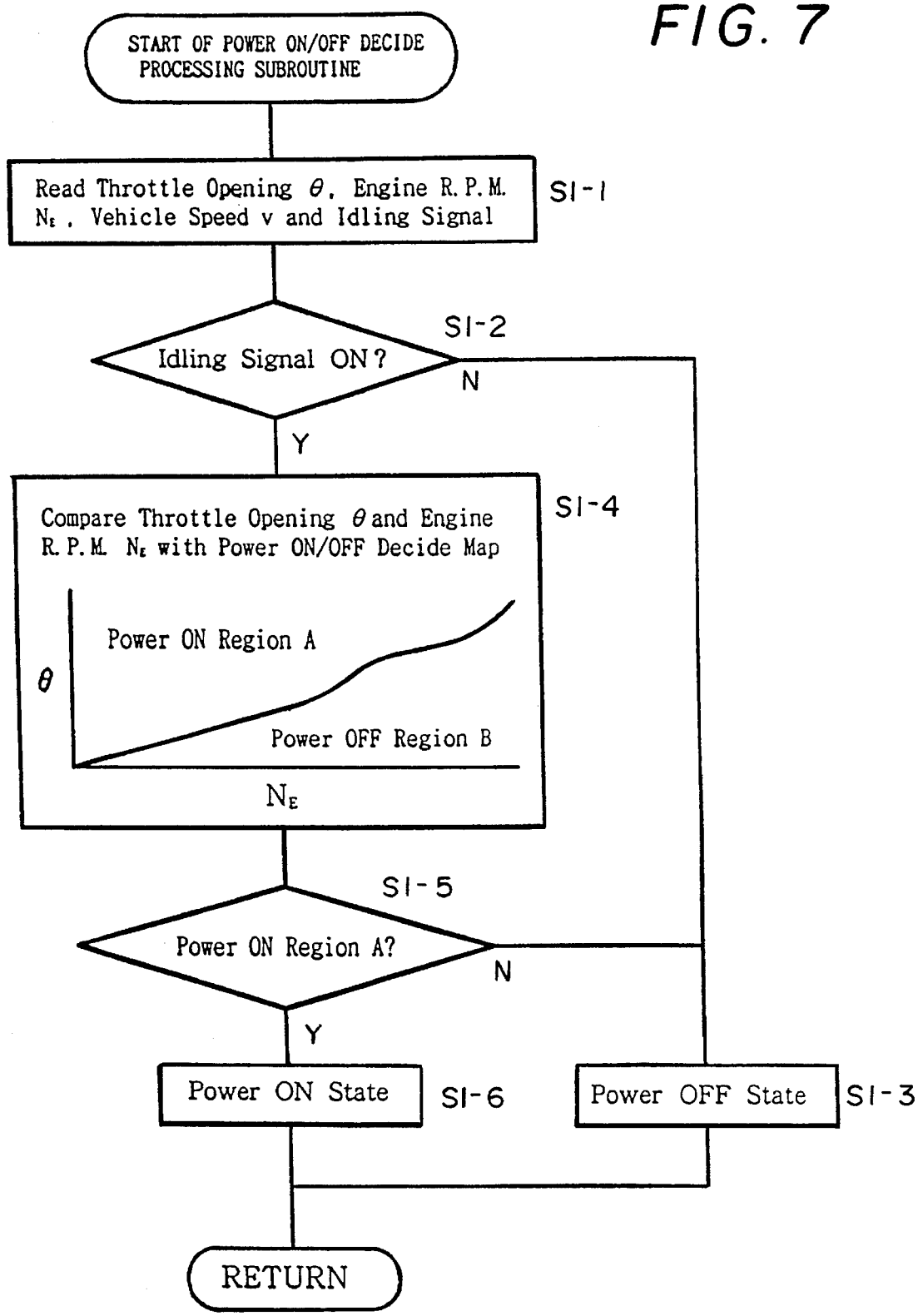
FIG. 7 is a flow chart illustrating a power ON/OFF decide processing subroutine in an embodiment of the present invention.

The power ON/OFF decision processing subroutine, by the power ON/OFF decision means 34 in Step S1 of FIG. 6, will now be described with reference to FIG. 7. In FIG. 7:

Step S1-1: The throttle opening θ, the vehicle speed v, the engine R.P.M. $N_E$ and an idling signal are read.

Step S1-2: It is decided whether or not the idling signal is ON. If ON, it is apparent that the accelerator pedal (not shown) is not depressed and the subroutine advances to Step S1-4. If OFF, the subroutine advances to Step S1-3.

Step S1-3: It is decided that the power is OFF.

Step S1-4: The throttle opening θ and the engine R.P.M. $N_E$ are compared with a power ON/OFF map. In this case, the power ON/OFF map has a power ON region A and a power OFF region B, as shown, and a point corresponding to the detected throttle opening θ and the detected engine R.P.M. $N_E$ is spotted on the map.

Step S1-5: It is decided whether or not the point spotted on the map is within the power ON region. The subroutine advances to Step S1-6, if the spotted point is within the power ON region A, and to Step S1-3, if within the power OFF region B.

Step S1-6: It is decided that the power is ON.

The shift decision processing subroutine utilized by the shift decision means 35 in at the Step S2 of FIG. 6, will now be described with reference to FIG. 8–11.

Figure 8:
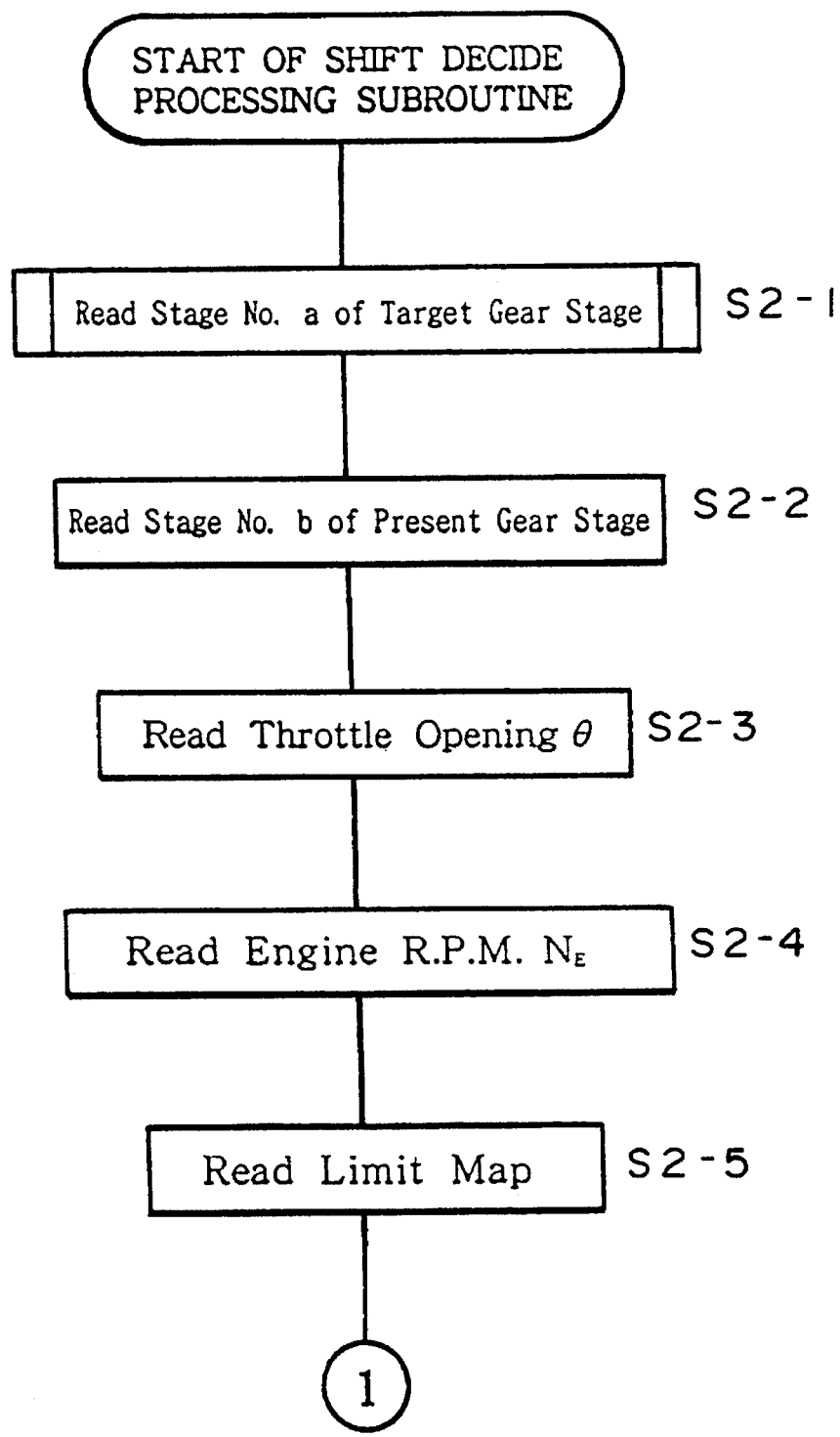
FIG. 8 is a flow chart illustrating one embodiment of a shift decide processing subroutine in accordance with the present invention.

In FIG. 8:

Step S2-1: Stage number a (a=1, 2, 3 or 4) of a target gear stage is read.

Step S2-2: Stage number b (b=1, 2, 3 or 4) of the present gear stage is read.

Step S2-3: The throttle opening θ is read.

Step S2-4: The engine R.P.M. $N_E$ is read.

Figure 10:
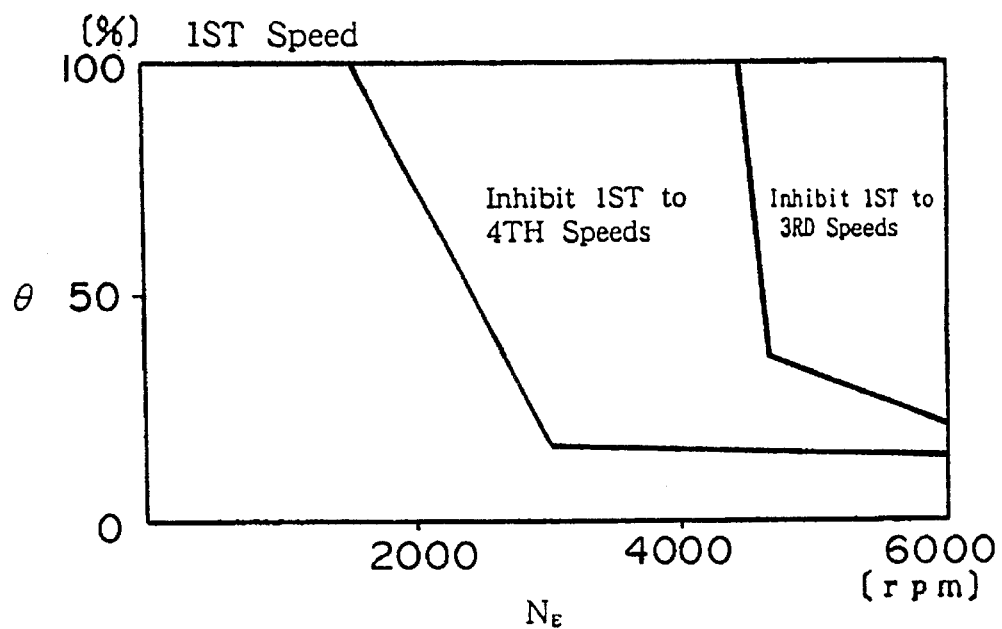
FIG. 10 is a graph illustrating a first example of a limit map in accordance with the present invention.
Figure 11:
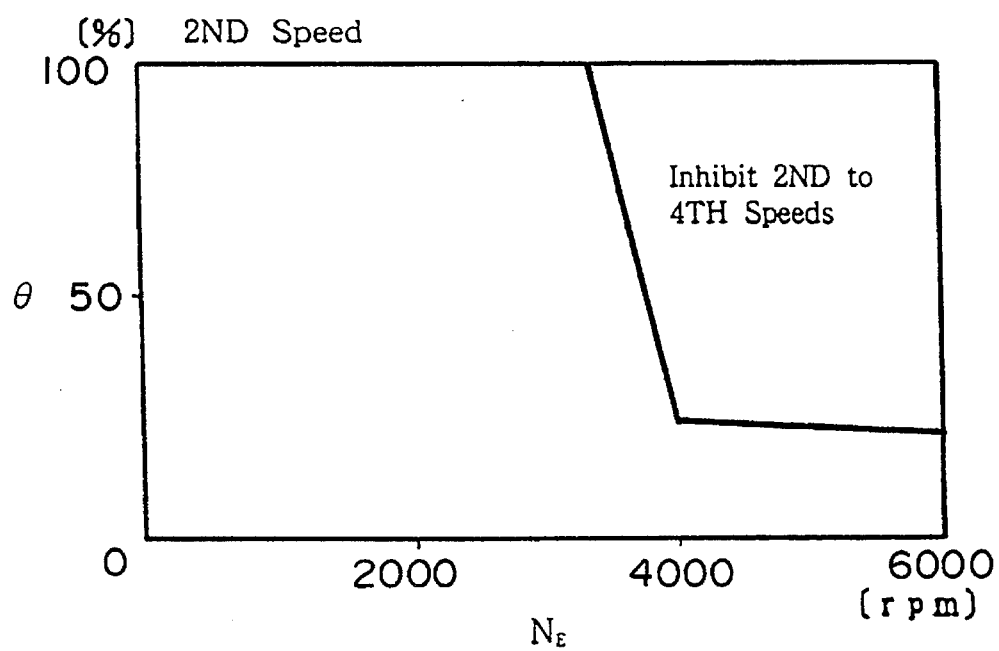
FIG. 11 is a diagram illustrating a second example of a limit map in accordance with the present invention.

Step S2-5: The limit maps for limiting the direct shift to the target gear stage, as shown in FIGS. 10 and 11, are read. A limit map is individually provided for each gear stage and set with a variety of shift limit regions in a manner to correspond to the throttle opening θ and the engine R.P.M. $N_E$. FIG. 10 presents a limit map for the case in which the present gear stage is at the 1st speed, and FIG. 11 presents a limit map for the case in which the present gear stage is at the 2nd speed.

Figure 9:
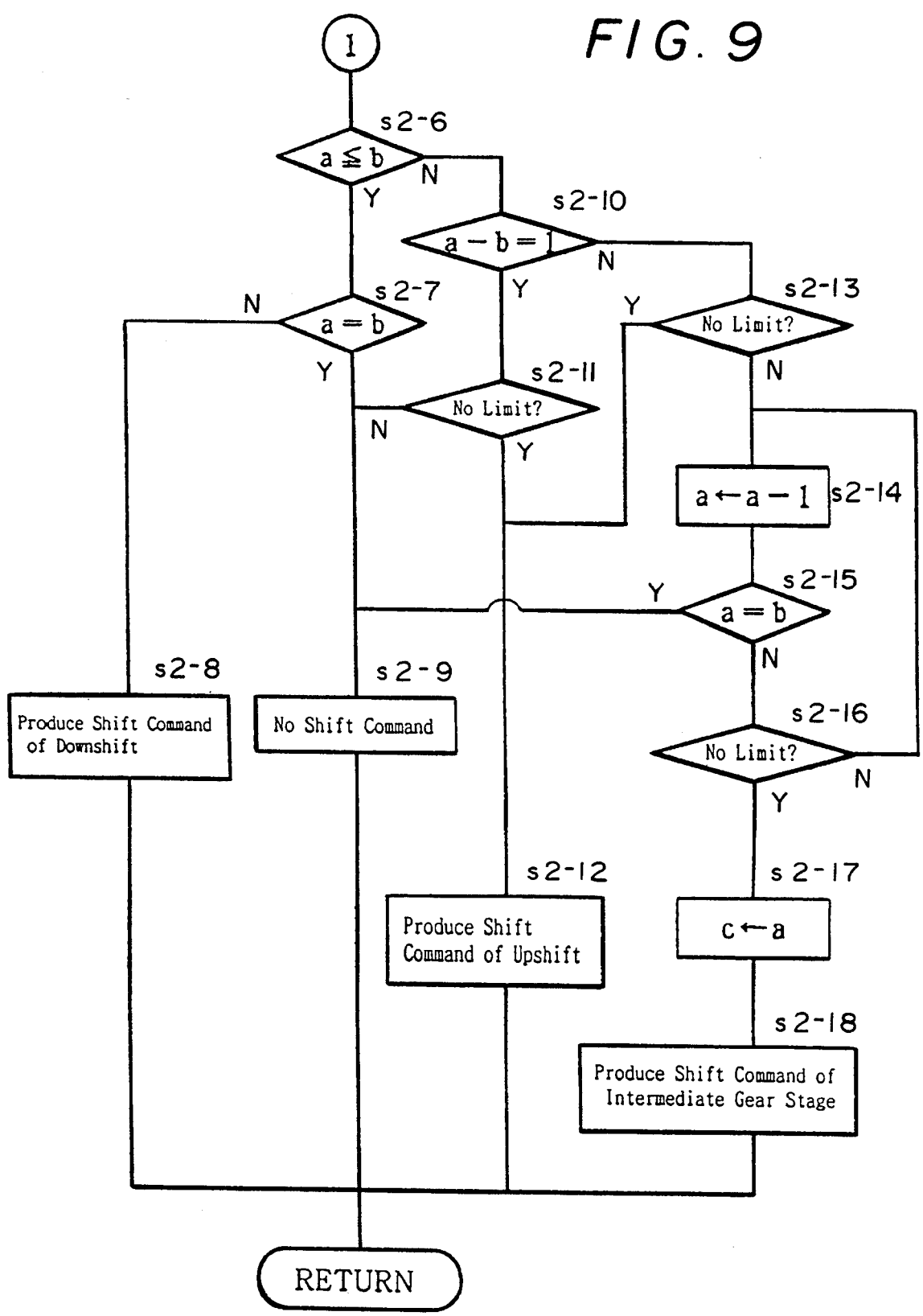
FIG. 9 is a flow chart illustrating another embodiment of a shift decide processing subroutine in accordance with the present invention.

In FIG. 9:

Step S2-6: It is decided whether or not the stage number a of the target gear stage is equal to or below the stage number b of the present gear stage. The subroutine advances to Step S2-7, if the stage number a is equal to or below the stage number b, and to Step S2-10, if the stage number a is over the stage number b.

Step S2-7: It is decided whether or not the stage number a of the target gear stage is equal to the stage number b of the present gear stage. The subroutine advances to Step S2-8, if the stage number a is not equal to the stage number b, and to Step S2-9, if equal.

Step S2-8: A shift command for a downshift is issued.

Step S2-9: No shift command is issued.

Step S2-10: It is decided whether or not the difference between the stage number a of the target gear stage and the stage number b of the present gear stage equals 1. The subroutine advances to Step S2-11, if 1, and to Step S2-13, if not.

Step S2-11: It is decided whether or not the shift to the target gear stage is limited by the limit map read at Step S2-5. The subroutine advances to Step S2-12, if the shift is not limited, and to Step S2-9, if limited.

Step S2-12: A shift command for an upshift is issued.

Step S2-13: It is decided whether or not a skip shift to the target gear stage is limited by the limit map. The subroutine advances to Step S2-12, if the skip shift is not limited, and to Step S2-14 if limited.

S2-14: The value calculated by subtracting 1 from the stage number a of the target gear stage is set as the stage number a of the new target gear stage.

Step S2-15: It is decided whether or not the stage number a of the new target gear stage is equal to the stage number b of the present gear stage. The subroutine advances to Step S2-9, if the stage number a is equal to the stage number b, and to Step S2-16 if not.

Step S2-16: It is decided whether or not a shift to the new target gear stage is limited by the limit map. The subroutine advances to Step S2-17, if the shift is not limited, and to Step S2-14, if limited.

Step S2-17: The stage number a of the new target gear stage is set to the stage number c of an intermediate gear stage.

Step S2-18: A shift command to the intermediate gear stage is issued.

The target gear stage read processing subroutine of Step S2-1 of FIG. 8. will now be described with reference to FIGS. 12–15.

Figure 12:
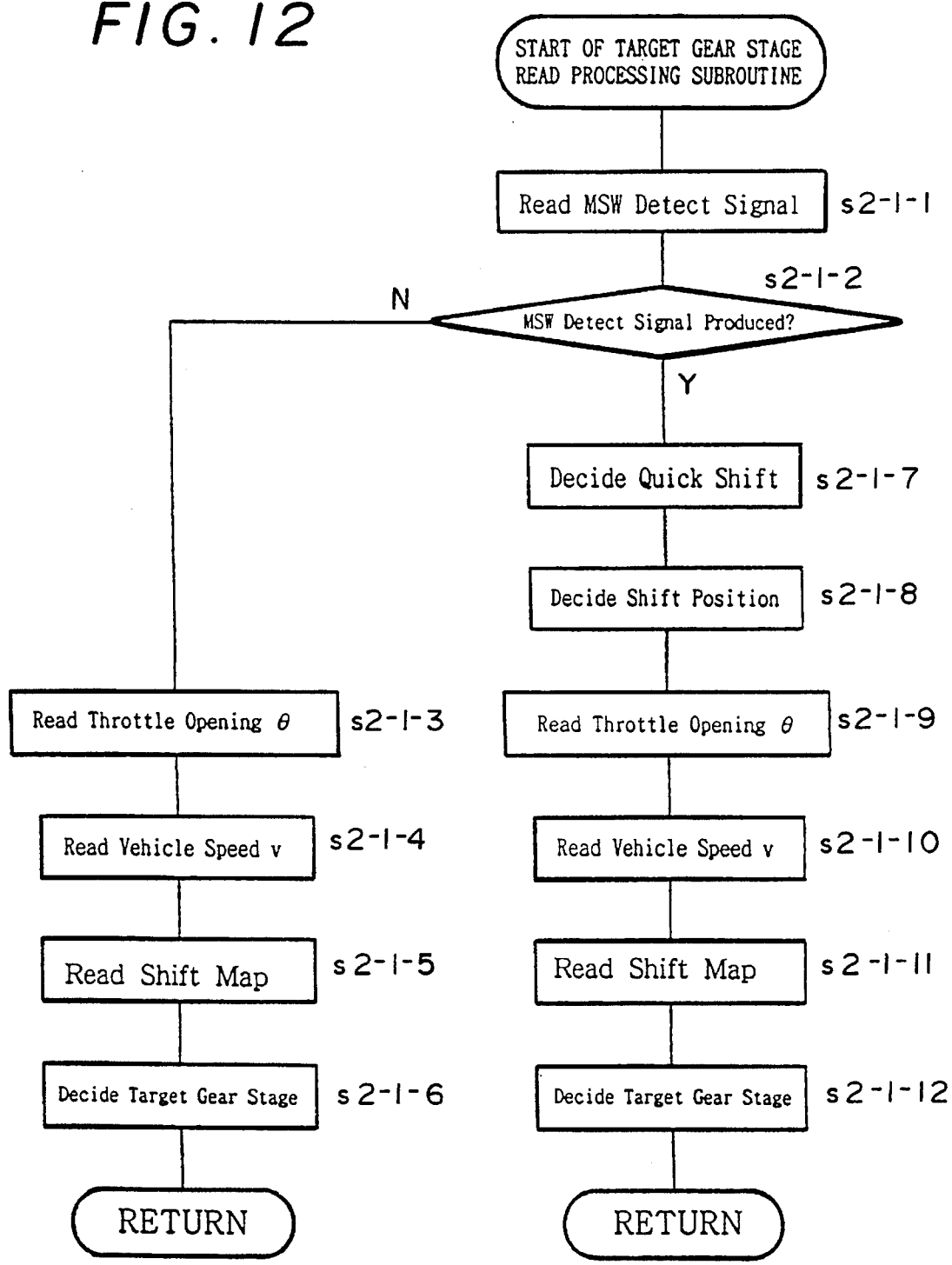
FIG. 12 is a flow chart illustrating a target gear stage read processing subroutine in accordance with the present invention.

In FIG. 12:

Step S2-1-1: The detection signals of manual switches MSW1 to MSW4 are read. As shown in FIG. 13: the manual switch MSW1 is turned ON when the shift lever (not shown) is moved backwards (or downwards, as shown); the manual switch MSW2 is turned ON when the shift lever is moved forward (or upward, as shown); the manual switch MSW3 is turned ON when the shift lever is moved rightward (as shown); and the manual switch MSW4 is turned ON when the shift lever is moved leftward (as shown).

Incidentally, the present embodiment employs the shift lever as the shift operating means, but the shift lever can be replaced by a push button switch.

Step S2-1-2: It is decided whether or not signal has issued from manual switches MSW1 to MSW4. This subroutine advances to Step S2-1-7, if a signal has issued from the manual switches MSW1 to MSW4, and to Step S2-1-3, if not.

Step S2-1-3: The throttle opening θ is read for effecting a shift in an automatic transmission mode.

Step S2-1-4: The vehicle speed v is read.

Step S2-1-5: The shift map (not shown) for the automatic transmission mode is read.

Step S2-1-6: A target gear stage corresponding to the vehicle speed v and the throttle opening θ is determined on the basis of the shift map for the automatic transmission mode.

Step S2-1-7: A quick shift decision for effecting a shift in the automatic transmission mode is made to issue a quick shift decision signal.

Step S2-1-8: The shift position is decided from the decision table of FIG. 14 on the basis of the detection signals of the manual switches MSW1 to MSW4.

Incidentally, in FIG. 14: letters D1 to D4 indicate the individual shift positions; symbol indicates that the individual manual switches MSW1 to MSW4 are ON; and symbol X indicates that the individual manual switches MSW1 to MSW4 are OFF.

Step S2-1-9: The throttle opening θ is read.

Step S2-1-10: The vehicle speed v is read.

Step S2-1-11: Shift maps which correspond to the individual shift positions D1 to D4 are read. Incidentally, FIG. 15 illustrates a shift map for the shift position D3.

Step S2-1-12: The target gear stage corresponding to the vehicle speed v and the throttle opening θ is decided on the basis of the shift map.

Figure 16:
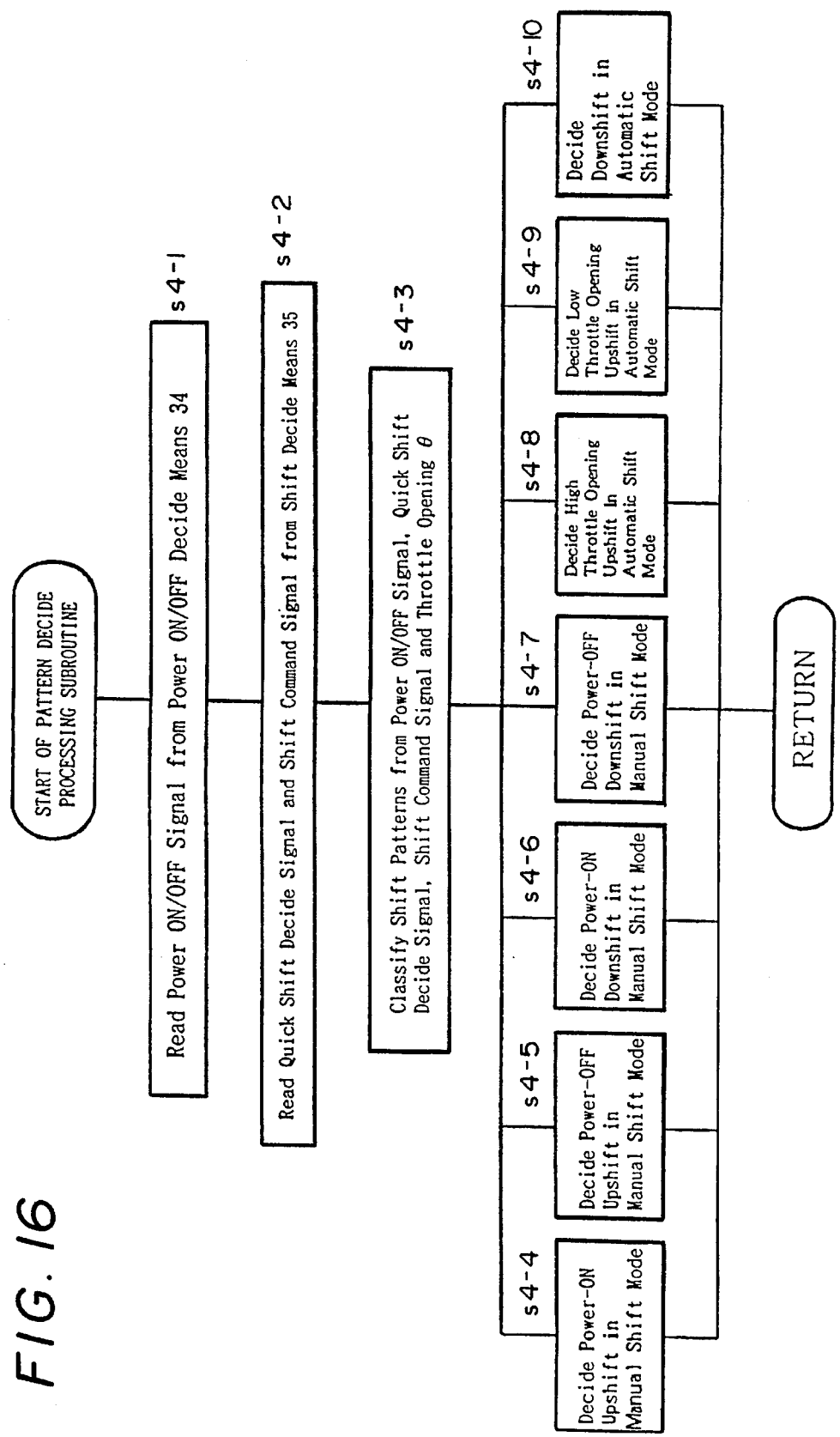
FIG. 16 is a flow chart illustrating a pattern decide processing subroutine in accordance with the present invention.
Figure 17:
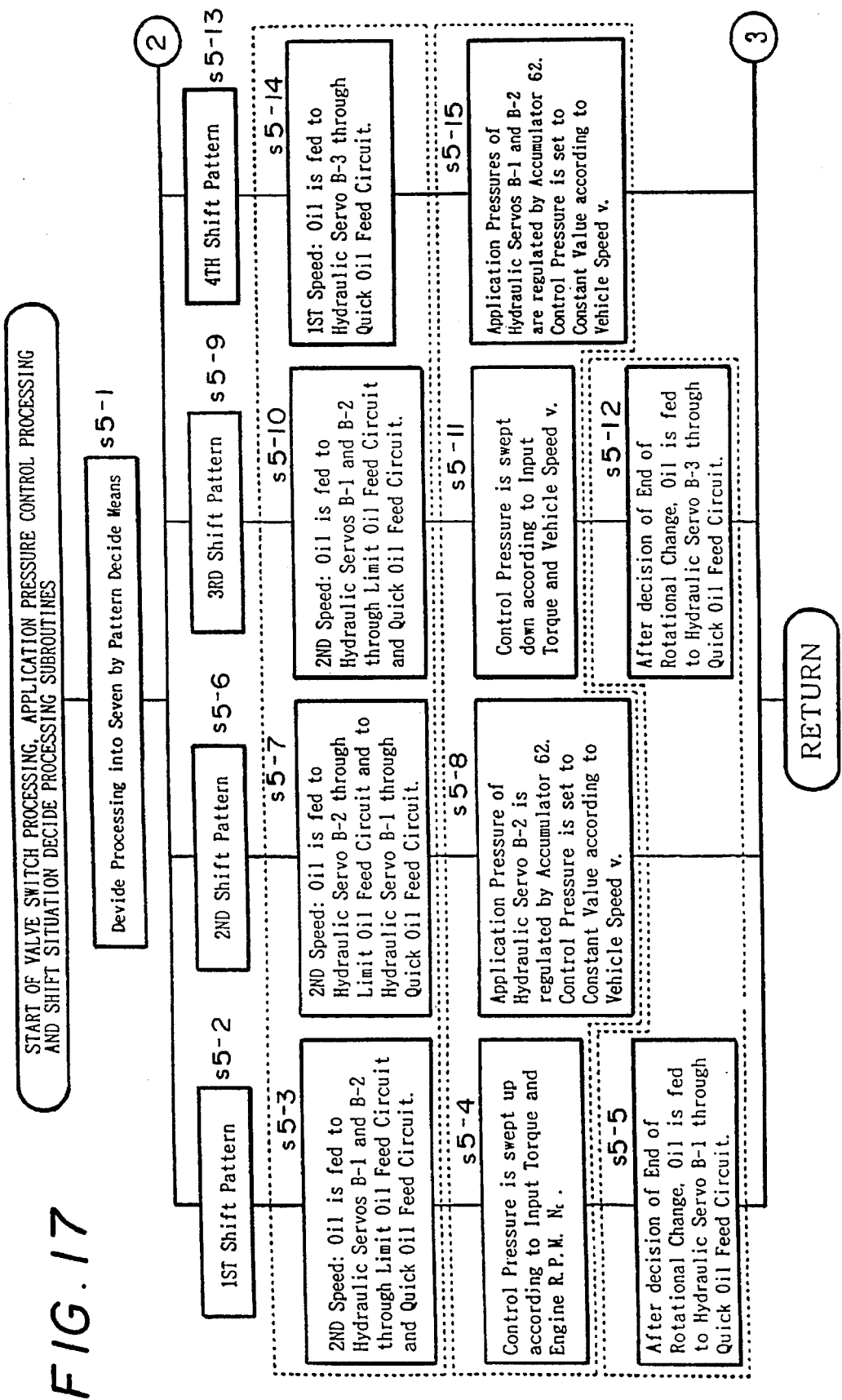
FIG. 17 is a flow chart of a first embodiment of valve switch processing, application pressure control processing and shift situation decision subroutines in accordance with the present invention.
Figure 18:
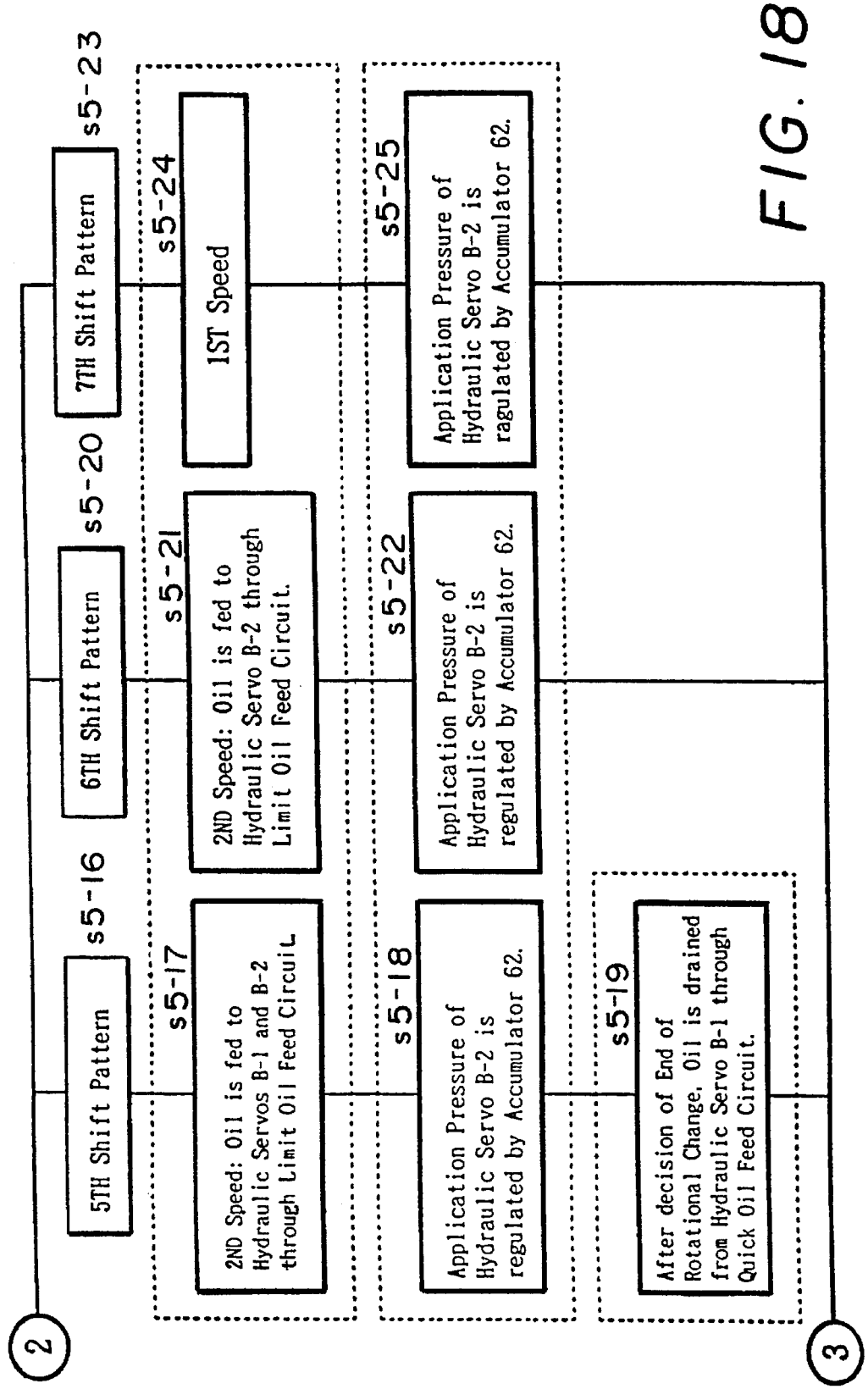
FIG. 18 is a flow chart of a second embodiment of valve switch processing, application pressure control processing and shift situation decision subroutines in accordance with the present invention.
Figure 19:
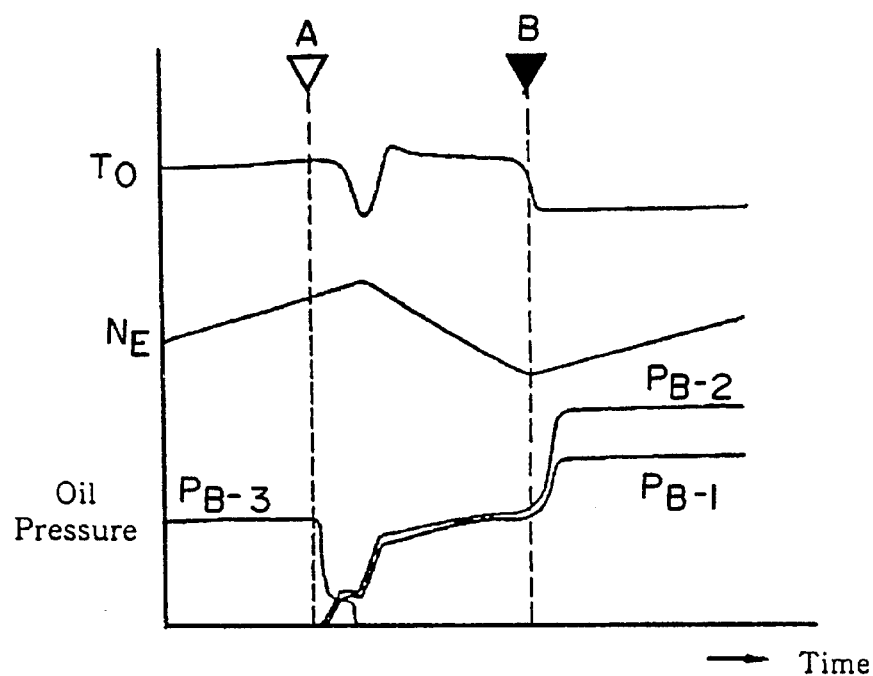
FIG. 19 is a graph in the form of a time chart illustrating a first shift pattern in accordance with the present invention.
Figure 20:
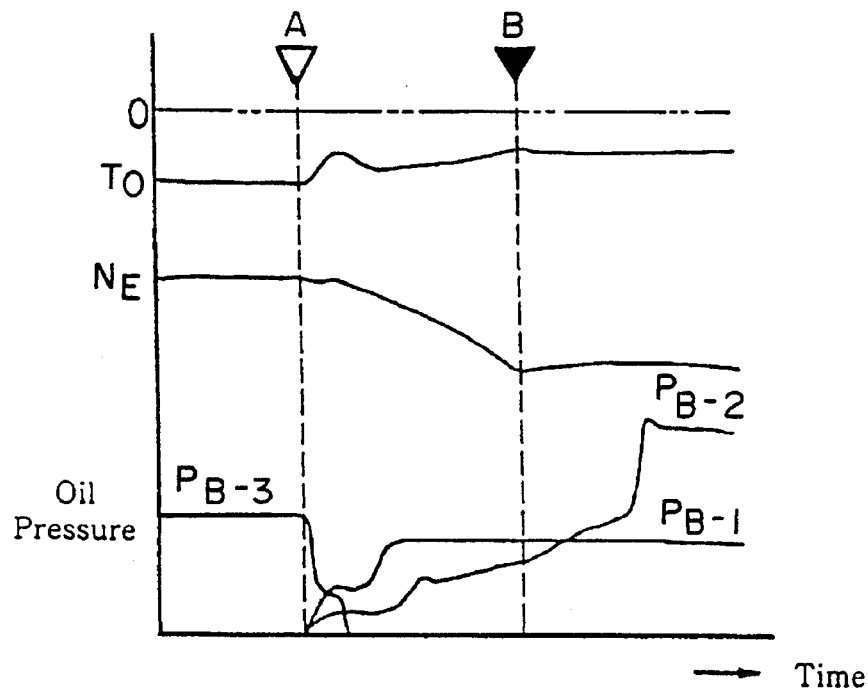
FIG. 20 is a graph in the form of a time chart illustrating a second shift pattern in accordance with the present invention.
Figure 21:
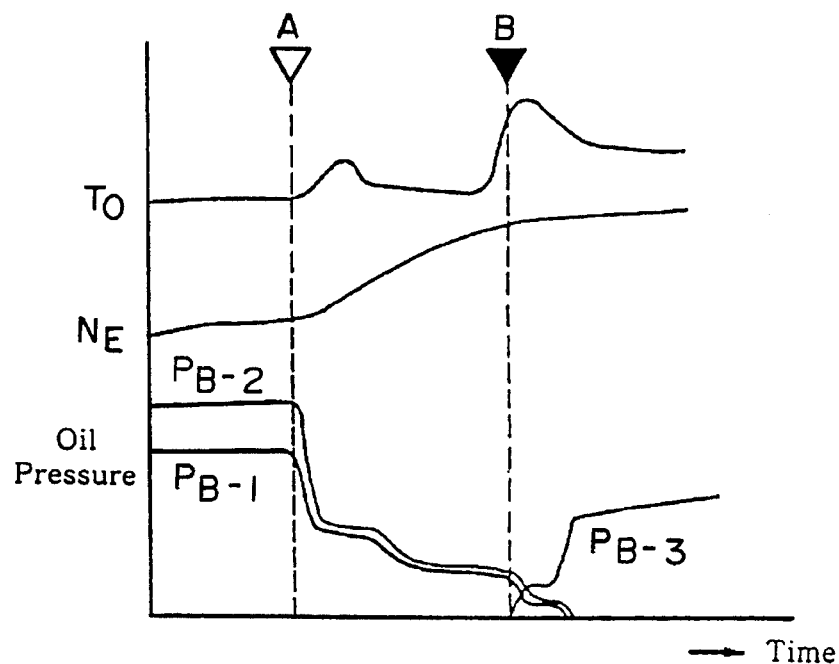
FIG. 21 is a graph in the form of a time chart illustrating a third shift pattern in accordance with the present invention.
Figure 22:
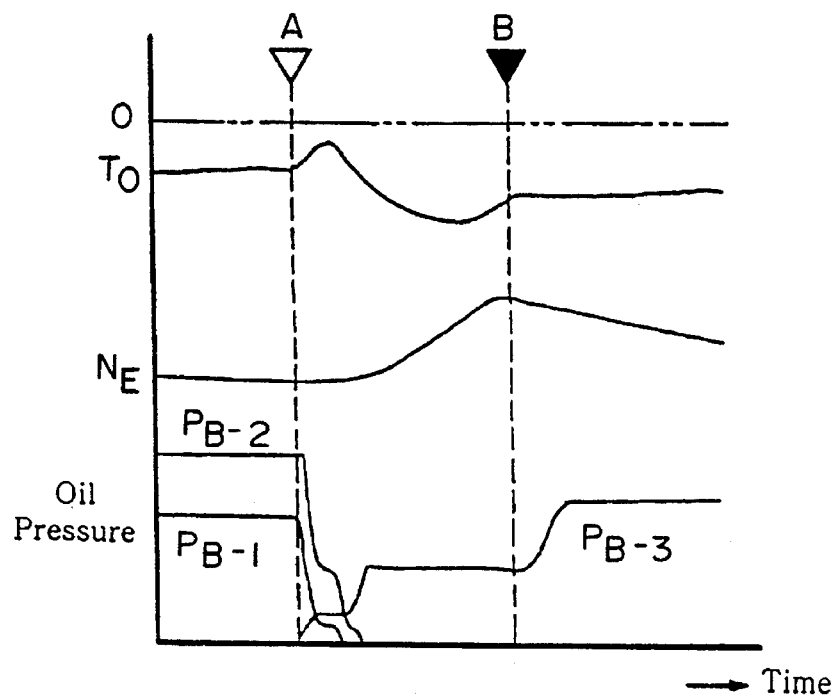
FIG. 22 is a graph in the form of a time chart illustrating a fourth shift pattern in accordance with the present invention.

Here will be described the pattern decision processing subroutine of Step S4 of FIG. 6, with reference to FIG. 16. In FIG. 16:

Step S4-1: The power ON/OFF signal is read from the power ON/OFF decision means 34.

Step S4-2: The quick shift decision signal and the shift command signal are read from the shift decision means 35.

Step S4-3: The shift patterns are classified on the basis of the power ON/OFF signal, quick shift decision signal, shift command signal and throttle opening θ signal.

Step S4-4: It is decided that the shift pattern is for a power-ON upshift in the manual transmission mode.

Step S4-5: It is decided that the shift pattern is for a power-OFF upshift in the manual transmission mode.

Step S4-6: It is decided that the shift pattern is for a power-ON downshift in the manual transmission mode.

Step S4-7: It is decided that the shift pattern is for a power-OFF downshift in the manual transmission mode.

Step S4-8: It is decided that the shift pattern is for a high throttle opening upshift in the automatic transmission mode.

Step S4-9: It is decided that the shift pattern is for a low throttle opening upshift in the automatic transmission mode.

Step S4-10: It is decided that the shift pattern is for a downshift in the automatic transmission mode.

Incidentally, if two or more frictional engagement elements are simultaneously applied, as described before, in conventional systems the shifting time period is prolonged and the shift feeling worsens. Therefore, the shifting time period is shortened by regulating the line pressure to produce a control pressure and feeding oil under the control pressure to each of the hydraulic servos in accordance with the decided shift patterns.

In FIGS. 19 to 25: letter A designates the point in time of the shift decision; letter B the time of a determination of the end of rotation; $T_o$ an output shaft torque; $N_E$ the engine R.P.M.; $P_{B-1}$ the application pressure of a hydraulic servo B1; $P_{B-2}$ the application pressure of a hydraulic servo B-2; and $P_{B-3}$ the application pressure of a hydraulic servo B-3.

Figure 1:
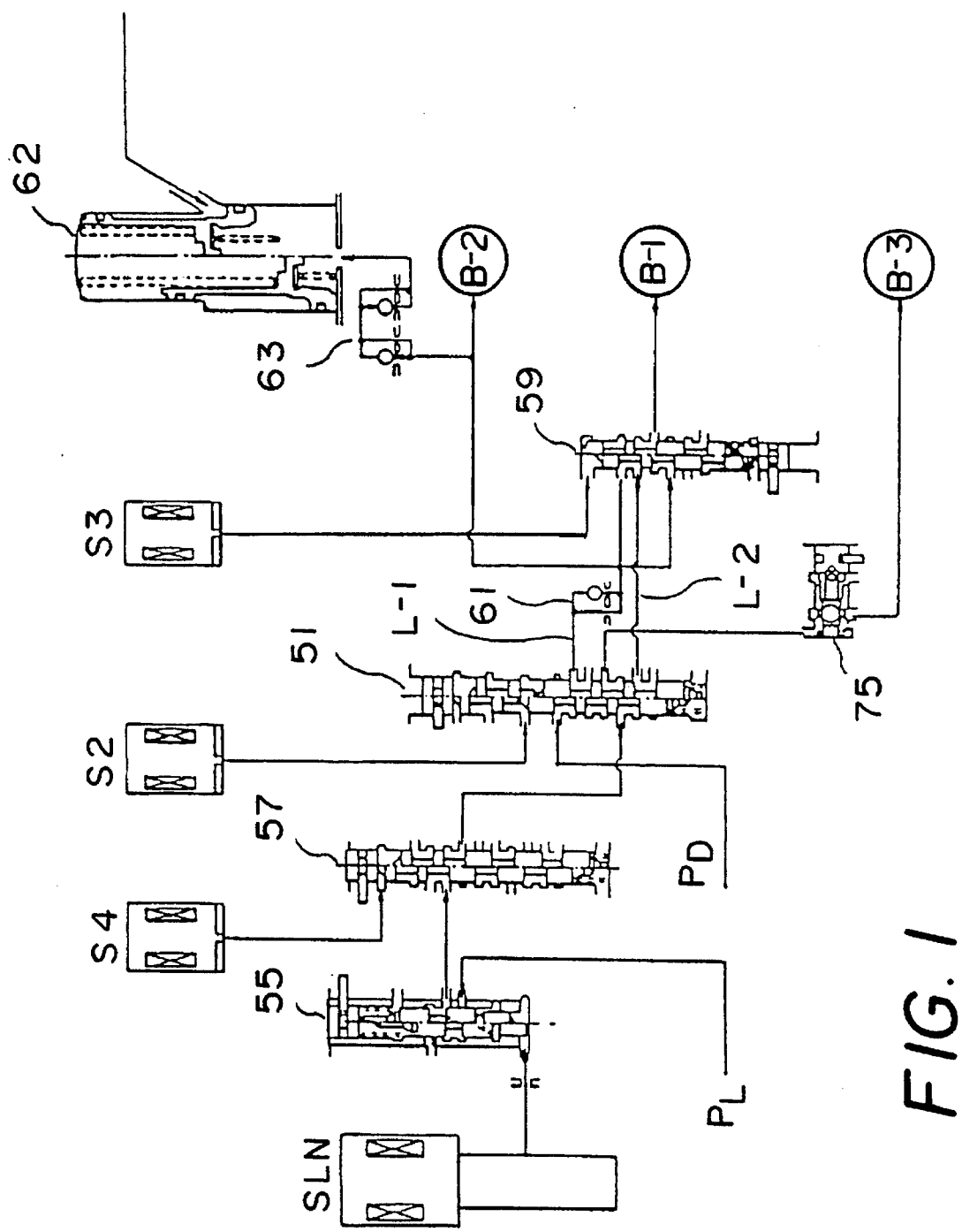
FIG. 1 is a hydraulic circuit diagram showing one embodiment of the present invention.

In FIG. 1: $P_L$ designates the line pressure; $P_D$ a D-range pressure; 51 a 1–2 shift valve for affecting the 1–2 shift; 55 a pressure control valve; 57 an engine brake control valve; and 59 a B-1 timing valve.

Moreover: B-1 designates a hydraulic servo for the first brake B1 (of FIG. 2) to be used for the engine brake at the 2nd speed; B-2 a hydraulic servo for the second brake B2 to be used for the D-range; and B-3 a hydraulic servo for the third brake B3 to be used at the 1st speed.

The hydraulic servo B-2 is fed with oil pressure through an orifice valve acting as the oil limit means so that its application pressure is adjusted by an accumulator 62 connected through an orifice valve 63. Incidentally, numeral 75 designates a check valve connected to the hydraulic servo B-3.

S2 is the solenoid valve for switching the 1–2 shift valve 51; S3 is the solenoid valve for switching the B-1 timing valve 59; S4 is the solenoid valve for switching the engine brake control valve 57; and SLN is the linear solenoid valve for actuating the pressure control valve 55 to regulate the line pressure to produce the necessary control pressure.

In case of the 1→2 shift in the first shift pattern (i.e., the power-ON upshift in the manual transmission mode), in the above-described hydraulic circuit, the solenoid of the solenoid valve S2 is turned ON whereas the individual solenoids of the solenoid valves S3 and S4 are turned OFF. At this time, the 1–2 shift valve 51 and the B-1 timing valve 59 take the lefthand half positions (hereinafter "left-half position") of the drawing whereas the engine brake control valve 57 takes the righthand half position (hereinafter the "right-half position") of the drawing.

As a result, oil at the D-range pressure $P_D$ is fed through the 1–2 shift valve 51 to the orifice valve 61, by which it is regulated, and fed to the hydraulic servo B-2 and further through the B-1 timing valve 59 to the hydraulic servo B-1.

On the other hand, oil at the control pressure is fed through the engine brake control valve 57, the 1–2 shift valve 51 and the B-1 timing valve 59 to the hydraulic servo B-2 and further through the B-1 timing valve 59 to the hydraulic servo B-1. In this case, the control pressure is swept up according to the input torque and the engine R.P.M. $N_E$.

Thus, oil is quickly fed to the hydraulic servos B-1 and B-2 byway of the limit oil feed circuit, wherein it is fed through the orifice valve 61 via the oil passage L-1, and by way of the quick oil feed circuit, which bypasses the orifice valve 61 via the oil passage L-2, so that the hydraulic servos B-1 and B-2 can be simultaneously applied. As a result, the time required for the hydraulic servos B-1 and B-2 to fill with oil is shortened, to shorten not only the time period from the shift decision to the start of application of the first and second brakes B1 and B2 but also the time period from the start of the application of the first and second brakes B1 and B2 to the end of the application (completion of engagement). As a result, the shifting time can be shortened to improve the shift feeling.

When the shift situation decision means 36 (of FIG. 5) decides that the rotational change has ended, the solenoid of the solenoid valve S2 is turned ON so that the B-1 timing valve 59 takes the right-half position. Then, the oil at D-range pressure $P_D$ is fed through the 1–2 shift valve 51 to the orifice valve 61, by which it is regulated and fed to the hydraulic servo B-2. In this case, the application pressure of the hydraulic servo B-2 is regulated by the accumulator 62 which is fed with oil through the orifice valve 63. On the other hand, oil-at the control pressure is fed through the engine brake control valve 57, the 1–2 shift valve 51 and the B-1 timing valve 59 to the hydraulic servo B-1.

In the case of the 1–2 shift in the second shift pattern (i.e., the power-OFF upshift in the manual transmission mode), on the other hand, the individual solenoids of the solenoid valves S2 and S3 are turned ON whereas the solenoid of the solenoid valve S4 is turned OFF. At this time, the 1–2 shift valve 51 takes the left-half position whereas the engine brake control valve 57 and the B-1 timing valve 59 take the right-half positions.

As a result, oil at D-range pressure $P_D$ is fed through the 1–2 shift valve 51 to the orifice valve 61, by which it is regulated and fed to the hydraulic servo B-2. In this case, the application pressure of the hydraulic servo B-2 is adjusted by the accumulator 62 which receives oil through the orifice valve 63.

On the other hand, oil at the control pressure is fed through the engine brake control valve 57, the 1–2 shift valve 51 and the B-1 timing valve 59 to the hydraulic servo B-1. In this case, the control pressure is set at a constant value according to the vehicle speed v.

Next, in the case of the 2→1 shift in the third shift pattern (i.e., the power-ON downshift in the manual transmission mode), the solenoid of the solenoid valve S2 is turned ON whereas the individual solenoids of the solenoid valves S3 and S4 are turned OFF. At this time, the 1–2 shift valve 51 and the B-1 timing valve 59 take the left-half positions whereas the engine brake control valve 57 takes the right-half position.

As a result, oil at D-range pressure $P_D$ is fed through the 1–2 shift valve 51 to the orifice valve 61, by which it is regulated and fed to the hydraulic servo B-2 and further through the B-1 timing valve 59 to the hydraulic servo B-1.

The oil fed to the hydraulic servo B-2 is further fed through the B-1 timing valve 59, the 1–2 shift valve 51 and the engine brake control valve 57 to the pressure control valve 55. Likewise, the oil fed to the hydraulic servo B-1 is also fed to the pressure control valve 55. In this case, the control pressure is swept down according to the input torque and the vehicle speed v.

When the shift situation decision means 36 decides that the rotational change has ended, the solenoid of the solenoid valve S2 is turned OFF so that shift valve 51 takes the left-half position. Then, the oil is drained from the hydraulic servos B-1 and B-2. Moreover, oil at the control pressure is fed through the engine brake control valve 57, the 1–2 shift valve 51 and the check valve 75 to the hydraulic servo B-3.

Thus, the oil is quickly fed to the hydraulic servo B-3 by way of the quick oil feed circuit which is formed through the orifice valve and the oil passage L-2. As a result, the period of time period for the hydraulic servo to be filled with oil is shortened, i.e. not only the period of time from the shift decision to the start of application of the third brake B3 is shortened but also the period of time from the start of the application of the third brake B3 to the end of the application is shortened. As a result, the shifting time can be shortened to improve the shift feeling.

Next, in the case of the 2→1 shift in the fourth shift pattern (i.e., the power-OFF downshift in the manual transmission mode), the solenoid of the solenoid valve S3 is turned ON whereas the individual solenoids of the solenoid valves S2 and S4 are turned OFF. At this time, the engine brake control valve 57 and the B-1 timing valve 59 take the left-half positions whereas the 1–2 shift valve 51 takes the righthalf position.

As a result, the oil in the hydraulic servos B-1 and B-2 is drained. In this case, the application pressure of the hydraulic servos B-1 and B-2 is adjusted by the accumulator 62 which has its oil drained through the orifice valve 63.

On the other hand, oil at the control pressure is fed through the engine brake control valve 57, the 1–2 shift valve 51 and the check valve 75 to the hydraulic servo B-3. In this case, the control pressure is set at a constant value according to the vehicle speed v.

Next, in the 1→2 shift in the fifth shift pattern (i.e., the high throttle opening upshift in the automatic transmission mode), the individual solenoid valves of the solenoid valves S2 and S4 are turned ON whereas the solenoid of the solenoid valve S3 is turned OFF. At this time, the 1–2 shift valve 51, the engine brake control valve 57 and the B-1 timing valve 59 take the left-half positions.

As a result, oil at the D-range pressure $P_D$ is fed through the 1–2 shift valve 51 to the orifice valve 61, by which it is regulated and fed to the hydraulic servo B-2, and further through the B-1 timing valve 59 to the hydraulic servo B-1. In this case, the application pressure of the hydraulic servo B-2 is adjusted by the accumulator 62 which is fed with the oil through the orifice valve 63. No oil at the control pressure is fed.

Figure 23:
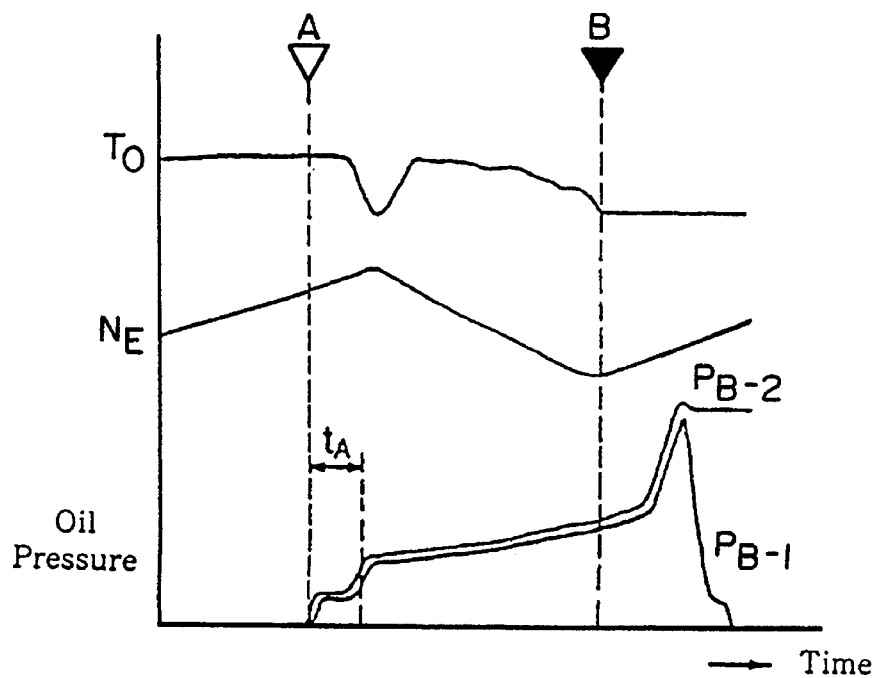
FIG. 23 is a graph in the form of a time chart illustrating a fifth shift pattern in accordance with the present invention.

Incidentally, only the time period $t_A$ of FIG. 23 is required, as in the first shift pattern, to feed the oil to the hydraulic servos B-1 and B-2 through the limit oil feed circuit, which is formed through the orifice valve 61 and the oil passage L-1, and through the quick oil feed circuit which bypasses the orifice valve 61 via the oil passage L-2. Thus, over the time period $t_A$, the oil is quickly fed by way of the quick oil feed circuit to the hydraulic servos B-1 and B-2 to shorten the time period from the shift decision to the start of the application of the third brake B3, thereby eliminating a time lag. After this, the oil is fed by way of the limit oil feed circuit to the hydraulic servos B-1 and B-2 to smoothen the shift.

When the shift situation decision means 36 decides that the rotational change has ended, the solenoid of the solenoid valve S3 turned ON so that the B-1 timing valve 59 takes the right-half position. Thus, the oil at D-range pressure $P_D$ is fed through the 1–2 shift valve 51 to the orifice valve 61, by which it is regulated and fed to the hydraulic servo B-2. In this case, the application pressure of the hydraulic servo B-2 is adjusted by the accumulator 62 which is fed with the oil through the orifice valve 63. In the meanwhile, the oil of the hydraulic servo B-1 is drained.

incidentally, when the shift situation decision means 36 decides the end of rotational change, the solenoid of the solenoid valve S3 can be turned ON to bring the B-1 timing valve 59 into the right-half position, and the solenoid of the solenoid valve S1 can be turned OFF to bring the pressure control valve 55 into the right-half position. In this case, oil at the control pressure can be quickly drained from the hydraulic servo B-1.

Next, in the 1→2 shift in the sixth shift pattern (i.e., the low throttle opening upshift in the automatic transmission mode), the individual solenoids of the solenoid valves S2, S3 and S4 are turned ON. At this time, the 1–2 shift valve 51 and the engine brake control valve 57 take the left-half positions whereas the B-1 timing valve 59 takes the right-half position.

As a result, the oil at the D-range pressure $P_D$ is fed through the 1–2 shift valve 51 to the orifice valve 61, by which it is regulated and fed to the hydraulic servo B-2. In this case, the application pressure of the hydraulic servo B-2 is adjusted by the accumulator 62 which is fed with oil through the orifice valve 63. Moreover, no oil at the control pressure is fed.

Figure 24:
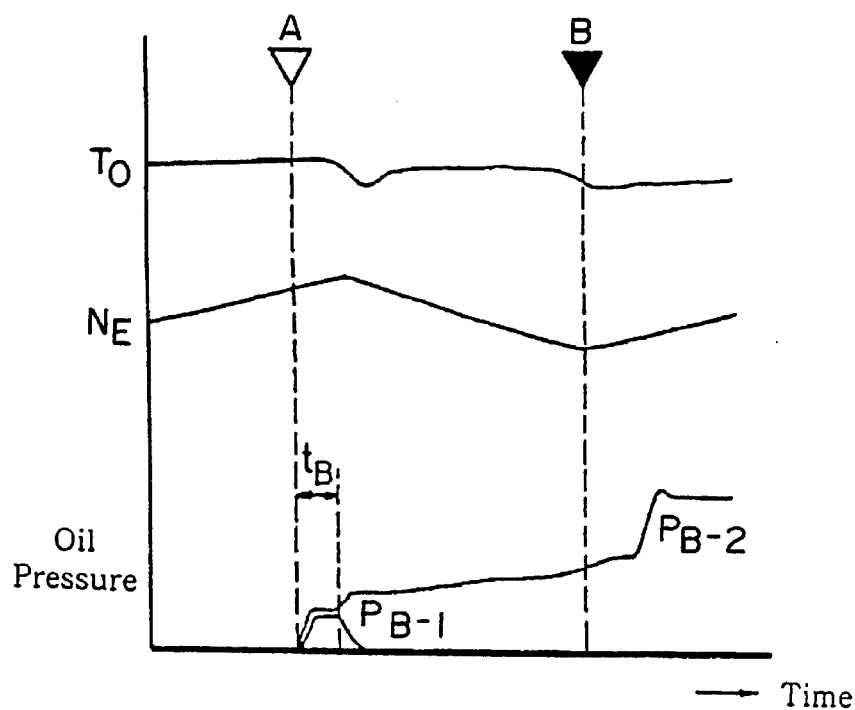
FIG. 24 is a graph in the form of a time chart illustrating a sixth shift pattern in accordance with the present invention.
Figure 25:
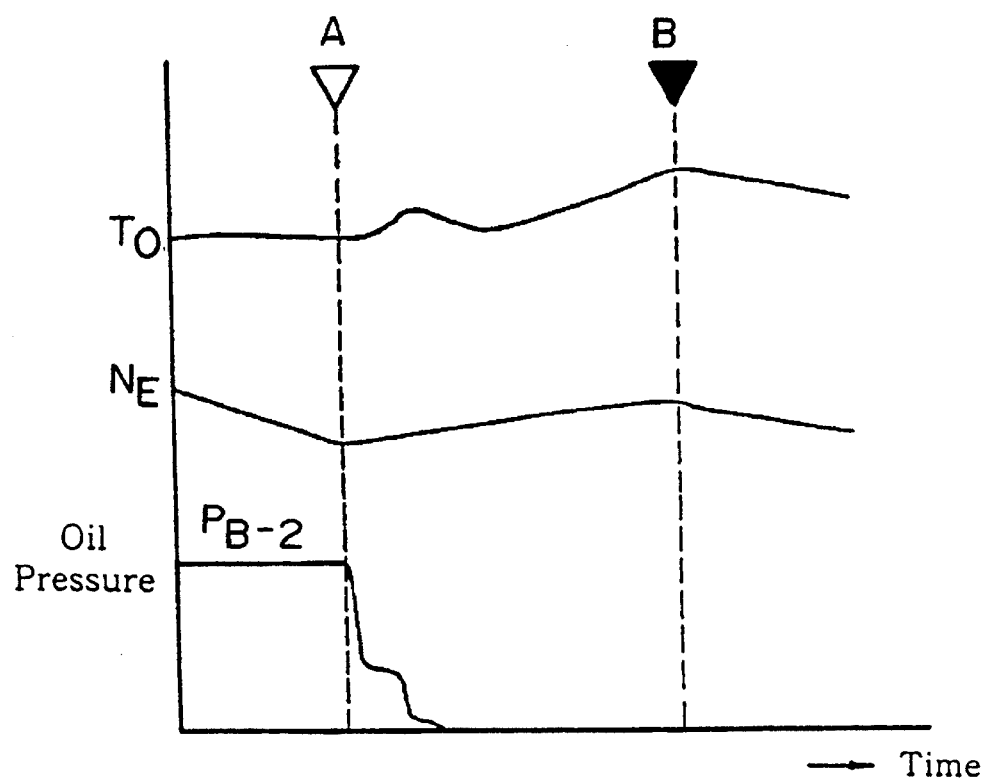
FIG. 25 is a graph in the form of a time chart illustrating a seventh shift pattern in accordance with the present invention.

Incidentally, only a time period $t_B$ as shown in FIG. 24 is required, as in the first shift pattern, for the oil to be quickly fed to the hydraulic servos B-1 and B-2 by way of the limit oil feed circuit, which is formed through the orifice valve 61 and via the oil passage L-1, and by way of the quick oil feed passage which bypasses the orifice valve 61 via the oil passage L-2.

Next, in the 2→1 shift in the seventh shift pattern (i.e., the downshift in the automatic transmission mode), the solenoid valve of the solenoid valve S4 is turned ON whereas individual solenoids of the solenoid valves S2 and S3 are turned OFF. At this time, the engine brake control valve 57 and the B-1 timing valve 59 take the left-half positions whereas the 1–2 shift valve 51 takes the right-half position.

As a result, the oil of the hydraulic servo B-2 is drained. In this case, the application pressure of the hydraulic servo B-2 is adjusted by the accumulator 62 which has its oil drained through the orifice valve 63. Step S5-1: According to the decision reached by the pattern decision means 37, the processing proceeds by one of the seven operations S5-2, S5-5, S5-9, S5-13, S5-16, S5-20 and S5-23. The subroutine advances to Step S5-2, if it is decided at Step S4-3 of FIG. 16 that the shift pattern of the vehicle is the first shift pattern; to Step S5-6, if the vehicular shift pattern is the second shift pattern; to Step S5-9, if the vehicular shift pattern is the third shift pattern; to Step S5-13, if the vehicular shift pattern is the fourth shift pattern; to Step S5-16, if the vehicular shift pattern is the fifth shift pattern; to Step S5-20, if the vehicular shift pattern is the sixth shift pattern; and to Step S5-23, if the vehicular shift pattern is the seventh shift pattern.

Step S5-2: The first shift pattern is established.

Step S5-3: The 1–2 shift valve 51 is brought into the 2nd speed state. The oil is quickly fed to the hydraulic servos B-1 and B-2 by way of the limit oil feed circuit and the quick oil feed circuit.

Step S5-4: The control pressure is swept up according to the input torque and the engine R.P.M. $N_E$.

Step S5-5: When the end of rotational change is decided, oil at the control pressure is fed to the hydraulic servo B-1 by way of the quick oil feed circuit.

Step S5-6: The second shift pattern is established.

Step S5-7: The 1–2 shift valve 51 is brought into the 2nd speed state. Oil at the D-range pressure $P_D$ is fed to the hydraulic servo B-2 by way of the limit pressure feed circuit, and the oil at the control pressure is fed to the hydraulic servo B-1 by way of the quick oil feed circuit.

Step S5-8: The application pressure of the hydraulic servo B-2 is adjusted by the accumulator 62. The control pressure is set at a constant value according to the vehicle speed v.

Step S5-9: The third shift pattern is established.

Step S5-10: The 1–2 shift valve 51 is brought into the 2nd speed state. The hydraulic servos B-1 and B-2 are fed with oil at the D-range pressure $P_D$ by way of the limit oil feed circuit and oil at the control pressure by way of the quick oil feed circuit.

Step S5-11: The control pressure is swept down according to the input torque and the vehicle speed v.

Step S5-12: When the end of rotational change is decided, oil at the control pressure is fed to the hydraulic servo B-3 by way of the quick oil feed circuit.

Step S5-13: The fourth shift pattern is established.

Step S5-14: The 1–2 shift valve 51 is brought into the 1st speed state. Oil at the control pressure is fed to the hydraulic servo B-3 by way of the quick oil feed circuit.

Step S5-15: The application pressures of the hydraulic servos B-1 and B-2 are adjusted by the accumulator 62. The control pressure is set at a constant value according to the vehicle speed v.

Step S5-16: The fifth shift pattern is established.

Step S5-17: The 1–2 shift valve 51 is brought into the 2nd speed state. Oil at the D-range pressure $P_D$ is fed to the hydraulic servos B-1 and B-2 by way of the limit oil feed circuit.

Step S5-18: The application pressure of the hydraulic servo B-2 is adjusted by the accumulator 62.

Step S5-19: When the end of rotational change is decided, oil at the control pressure is drained from the hydraulic servo B-1 by way of the quick oil feed circuit.

Step S5-20: The sixth shift pattern is established.

Step S5-21: The 1–2 shift valve 51 is set to the 2nd speed state. Oil at the D-range pressure $P_D$ is fed to the hydraulic servo B-2 by way of the limit oil feed circuit.

Step S5-22: The application pressure of the hydraulic servo B-2 is adjusted by the accumulator 62.

Step S5-23: The seventh shift pattern is established.

Step S5-24: The 1–2 shift valve 51 is brought into the 1st speed state.

Step S5-25: The application pressure of the hydraulic servo B-2 is adjusted by the accumulator 62.

The invention may be embodied in other specific forms without departing from its spirit or essential characteristics. The present embodiments are, therefore, to be considered in all respects as illustrative and not restrictive, the scope of the invention being further indicated by the claims rather than limited by the foregoing description, and all changes which come within the meaning and range of the equivalents of the claims are therefore intended to be embraced therein.

What is claimed is:

1. A control system for an automatic transmission, coupled to and driven by an engine, for affecting a shift to a target gear stage by applying/releasing a plurality of frictional engagement elements selectively by selective operation of a plurality of hydraulic servos, the transmission and engine being mounted in a vehicle and the control system comprising:

a vehicle speed sensor for detecting speed of the vehicle and outputting a speed signal;

a throttle opening sensor for detecting throttle opening and outputting a throttle opening signal;

electronic control means for outputting a shift signal in accordance with said signals;

a plurality of hydraulic servos, including first and second hydraulic servos, for effecting the shift to the target gear stage by operation of the frictional engagement elements;

a limit oil feed circuit for feeding oil pressure to said hydraulic servos through oil limit means for limiting oil flow;

a quick oil feed circuit for feeding oil pressure to said selected hydraulic servos, bypassing said oil limit means;

an oil passage switch valve for selectively connecting said limit oil feed circuit or said quick oil feed circuit to said first and second hydraulic servos;

a plurality of solenoid valves, actuated in response to the shift signal of said electronic control means, to selectively feed oil to the hydraulic servos, said plurality of solenoid valves including a first solenoid valve for switching said oil passage switch valve in response to said shift signal; and wherein said electronic control means includes:

power ON/OFF decision means for deciding the magnitude of engine load on the basis of the throttle opening signal and for generating a power ON signal when the decided magnitude of engine load falls within a predetermined power ON range and a power OFF signal when the decided magnitude of engine load falls within a predetermined power OFF range; and valve switch means for signalling said first solenoid to switch said oil passage switch valve to provide oil pressure from said quick oil feed circuit to said first and said second hydraulic servos, responsive to the power ON signal, and for signaling said first solenoid to switch said oil passage switch valve to provide oil pressure from said limit oil feed circuit to at least said first hydraulic servo, responsive to the power OFF signal.

2. A control system for an automatic transmission according to claim 1, further comprising:

oil pressure regulating means for regulating a line oil pressure to provide a control pressure, said pressure regulating means feeding the oil under said control pressure to said quick oil feed circuit to adjust the shift transition characteristics of said first and said second hydraulic servos.

3. A control system for an automatic transmission according to claim 2, further comprising:

shift select means for manually selecting an automatic transmission mode or a manual transmission mode.

4. A control system for an automatic transmission according to claim 3, further comprising:

shift detect means for detecting operation of said shift select means and for generating a shift detect signal;

shift decision means for deciding the type of shift to be executed on the basis of said shift detect signal;

pattern decision means for deciding a shift pattern to said target gear stage by combining the decision of said power ON/OFF decision means and the decision of said shift decision means; and wherein said valve switch means outputs a signal for switching said oil passage switch in accordance with the shift pattern decided by said pattern decision means.

\* \* \* \* \*

UNITED STATES PATENT AND TRADEMARK OFFICE
CERTIFICATE OF CORRECTION

PATENT NO. : 5,505,673
DATED : April 9, 1996
INVENTOR(S) : TSUKAMOTO et al

It is certified that error appears in the above-indentified patent and that said Letters Patent is hereby corrected as shown below:

Col. 3, line 8, after "accordance" insert --with--;
      line 32, delete "prevent" insert --present--.

Col. 4, line 33, "$CR_1$" insert --$CR_2$--.

Col. 8, line 58, after "symbol" insert --O--.

Col. 10, line 44, "oil-at" should read --oil at--.

Col. 12, line 61, being new paragraph with "Step S5-1".

Signed and Sealed this

Twenty-fourth Day of December, 1996

Attest:

BRUCE LEHMAN

Attesting Officer     Commissioner of Patents and Trademarks